US010315606B2

(12) United States Patent
Ohno et al.

(10) Patent No.: US 10,315,606 B2
(45) Date of Patent: Jun. 11, 2019

(54) OCCUPANT PROTECTION DEVICE

(71) Applicant: TOYOTA JIDOSHA KABUSHIKI KAISHA, Toyota-shi, Aichi (JP)

(72) Inventors: Mitsuyoshi Ohno, Miyoshi (JP); Katsuya Shimazu, Toyota (JP); Hiroaki Iwamoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/562,200

(22) PCT Filed: Sep. 17, 2015

(86) PCT No.: PCT/JP2015/076591
§ 371 (c)(1),
(2) Date: Sep. 27, 2017

(87) PCT Pub. No.: WO2016/174785
PCT Pub. Date: Nov. 3, 2016

(65) Prior Publication Data
US 2018/0236962 A1 Aug. 23, 2018

(30) Foreign Application Priority Data
Apr. 28, 2015 (JP) ................................ 2015-091472

(51) Int. Cl.
*B60R 21/16* (2006.01)
*B60R 21/207* (2006.01)
(Continued)

(52) U.S. Cl.
CPC ...... *B60R 21/207* (2013.01); *B60R 21/23138* (2013.01); *B60R 2021/0006* (2013.01);
(Continued)

(58) Field of Classification Search
CPC ............ B60R 21/207; B60R 21/23138; B60R 2021/0048; B60R 2021/161;
(Continued)

(56) References Cited

U.S. PATENT DOCUMENTS 9,533,651 B1 * 1/2017 Ohno ................ B60R 21/23138
9,573,553 B2 2/2017 Ko et al.
(Continued)

FOREIGN PATENT DOCUMENTS

CN 104228746 A 12/2014
DE 92 02 725 U1 8/1992
(Continued)

OTHER PUBLICATIONS

Dec. 8, 2017 Office Action issued in U.S. Appl. No. 15/211,464.
(Continued)

*Primary Examiner* — Toan C To
(74) *Attorney, Agent, or Firm* — Oliff PLC

(57) ABSTRACT

An occupant protection device includes a multidirectional airbag that inflates and deploys from a state housed in a headrest on receipt of supplied gas. The multidirectional airbag is configured as an integral bag body to surround a head of a seated occupant with a front deployment section and a pair of left and right lateral deployment sections. The front deployment section includes a front inflating portion that deploys to a seat forward direction of the head of the seated occupant and of at least one of a shoulder or chest of the seated occupant. Each of the pair of left and right lateral deployment sections includes a lateral inflating portion that is connected to the front deployment section and inflates and deploys alongside the head of the seated occupant.

20 Claims, 13 Drawing Sheets

(51) Int. Cl.
  *B60R 21/231* (2011.01)
  *B60R 21/00* (2006.01)
(52) U.S. Cl.
  CPC ............. *B60R 2021/0009* (2013.01); *B60R 2021/0048* (2013.01); *B60R 2021/161* (2013.01); *B60R 2021/2074* (2013.01); *B60R 2021/23107* (2013.01); *B60R 2021/23146* (2013.01); *B60R 2021/23161* (2013.01)
(58) Field of Classification Search
  CPC .. B60R 2021/2074; B60R 2021/23146; B60R 2021/0006; B60R 2021/23107; B60R 2021/0009; B60R 2021/23161
  USPC ............................................ 280/730.1, 730.2
  See application file for complete search history.

(56) References Cited

U.S. PATENT DOCUMENTS

| | | | |
|---|---|---|---|
| 2006/0131847 A1* | 6/2006 | Sato | B60R 21/207 280/730.2 |
| 2012/0049493 A1 | 3/2012 | Lee | |
| 2013/0015642 A1* | 1/2013 | Islam | B60R 21/207 280/730.1 |
| 2013/0093224 A1* | 4/2013 | Dainese | B60R 21/207 297/216.12 |
| 2014/0327234 A1 | 11/2014 | Heurlin et al. | |
| 2015/0091278 A1 | 4/2015 | Yasuoka | |
| 2016/0121839 A1* | 5/2016 | Ko | B60R 21/233 280/730.1 |
| 2016/0347272 A1* | 12/2016 | Kato | B60R 21/207 |
| 2017/0136977 A1* | 5/2017 | Ohno | B60R 21/013 |
| 2017/0158155 A1* | 6/2017 | Ohno | B60R 21/207 |
| 2017/0203711 A1* | 7/2017 | Ohno | B60R 21/231 |
| 2017/0291565 A1* | 10/2017 | Yamamoto | B60R 21/207 |
| 2017/0291569 A1* | 10/2017 | Sugie | B60R 21/01552 |
| 2017/0297524 A1* | 10/2017 | Sugie | B60R 21/01554 |
| 2017/0334385 A1* | 11/2017 | Sakakibara | B60N 2/68 |

FOREIGN PATENT DOCUMENTS

| | | |
|---|---|---|
| DE | 198 34 061 A1 | 2/2000 |
| DE | 19859988 B4 | 6/2010 |
| FR | 2 133 239 A5 | 11/1972 |
| GB | 1 301 867 A | 1/1973 |
| JP | H10-244894 A | 9/1998 |
| JP | 2000-094999 A | 4/2000 |
| JP | 2000-344044 A | 12/2000 |
| JP | 2005-088675 A | 4/2005 |
| JP | 2007-230395 A | 9/2007 |
| JP | 2008-207661 A | 9/2008 |
| JP | 2010-126141 A | 6/2010 |
| JP | 2012-051541 A | 3/2012 |
| JP | 2013-018378 A | 1/2013 |
| JP | 2015-013553 A | 1/2015 |
| JP | 2015-071317 A | 4/2015 |
| JP | 2016-222072 A | 12/2016 |
| WO | 03/043859 A1 | 5/2003 |

OTHER PUBLICATIONS

U.S. Appl. No. 15/211,464, filed Jul. 15, 2016 in the name of Ohno et al.
Apr. 12, 2018 Notice of Allowance issued in U.S. Appl. No. 15/211,464.
Mar. 27, 2018 Search Report issued in European Patent Application No. 15890768.3.
May 16, 2018 Notice of Allowance issued in U.S. Appl. No. 15/211,464.
Jan. 23, 2018 Office Action issued in Japanese Patent Application No. 2015-148994.

* cited by examiner

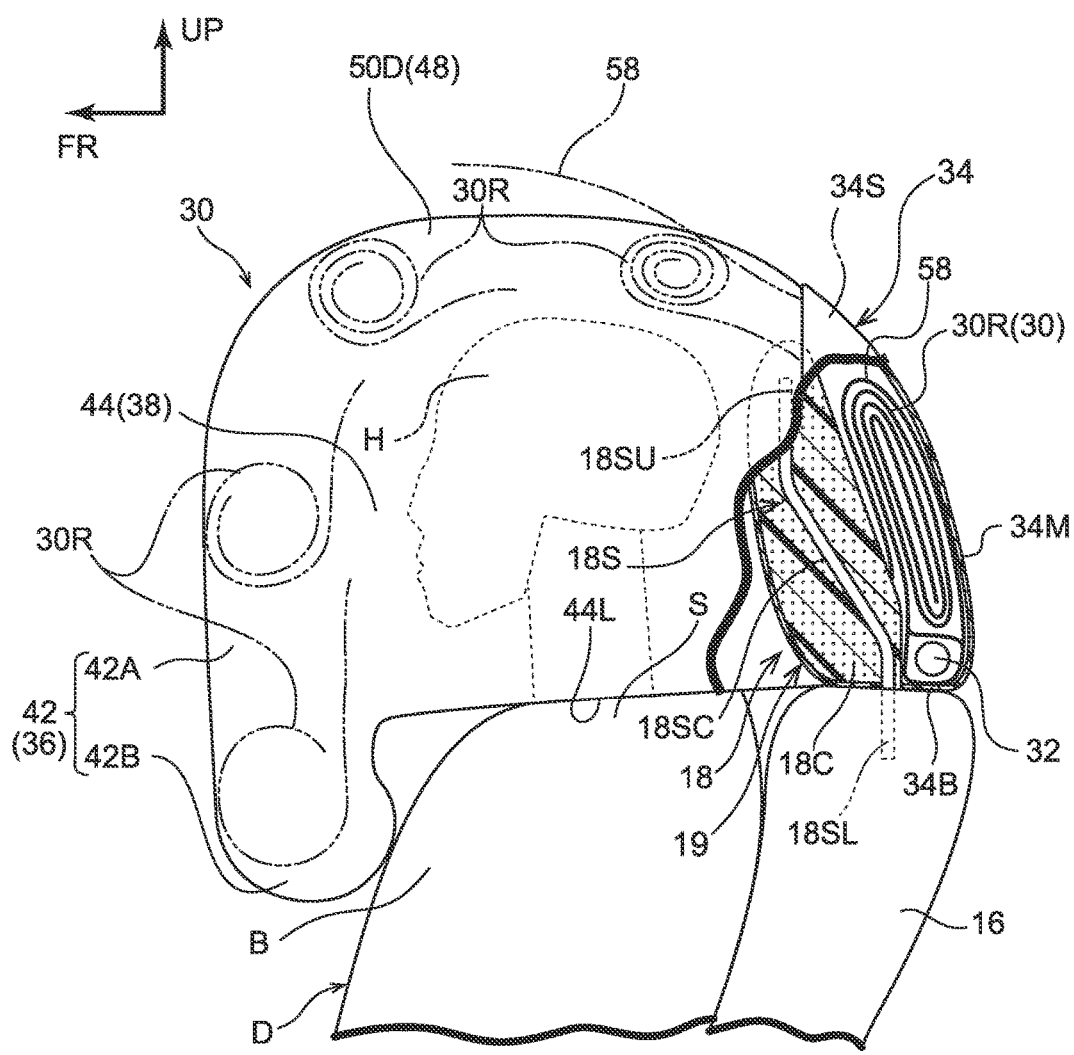

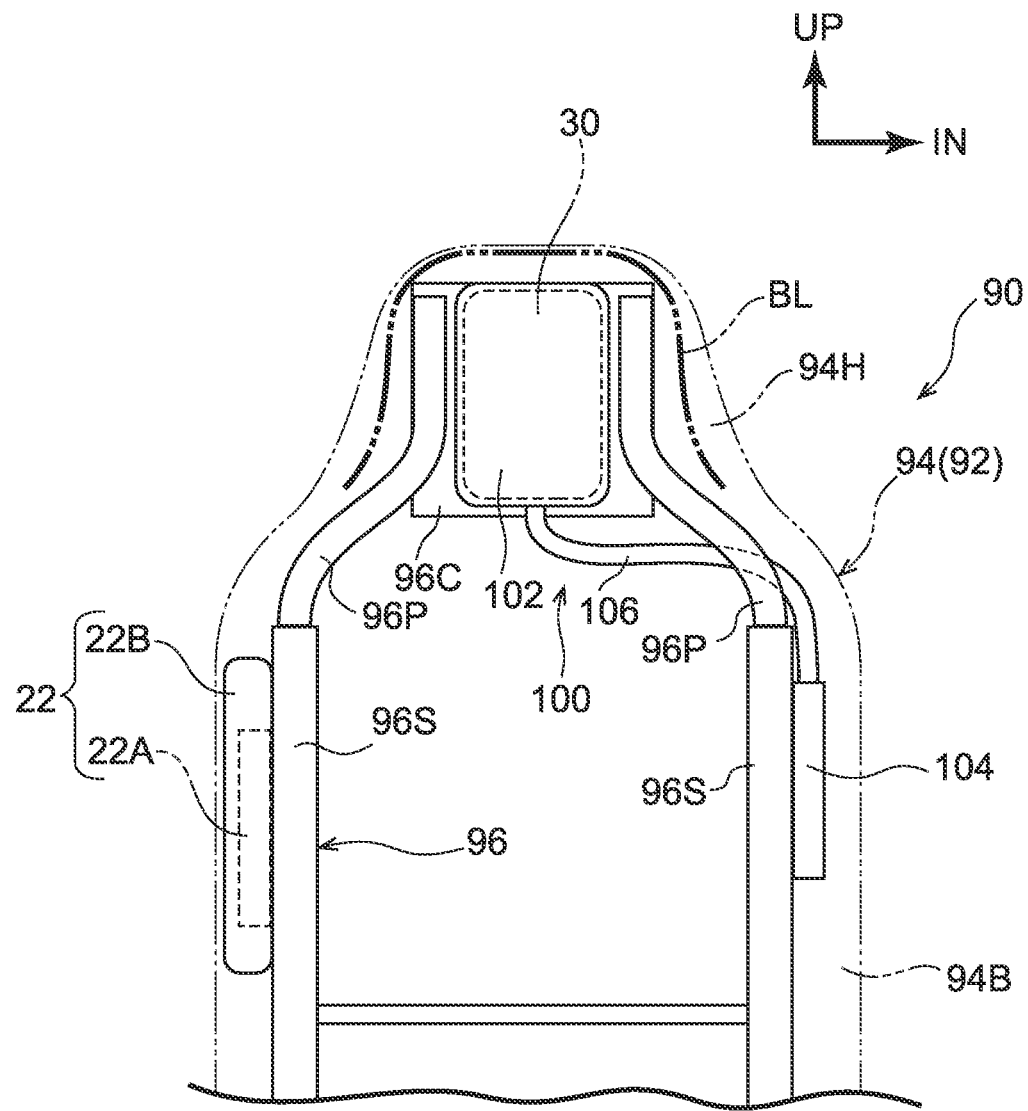

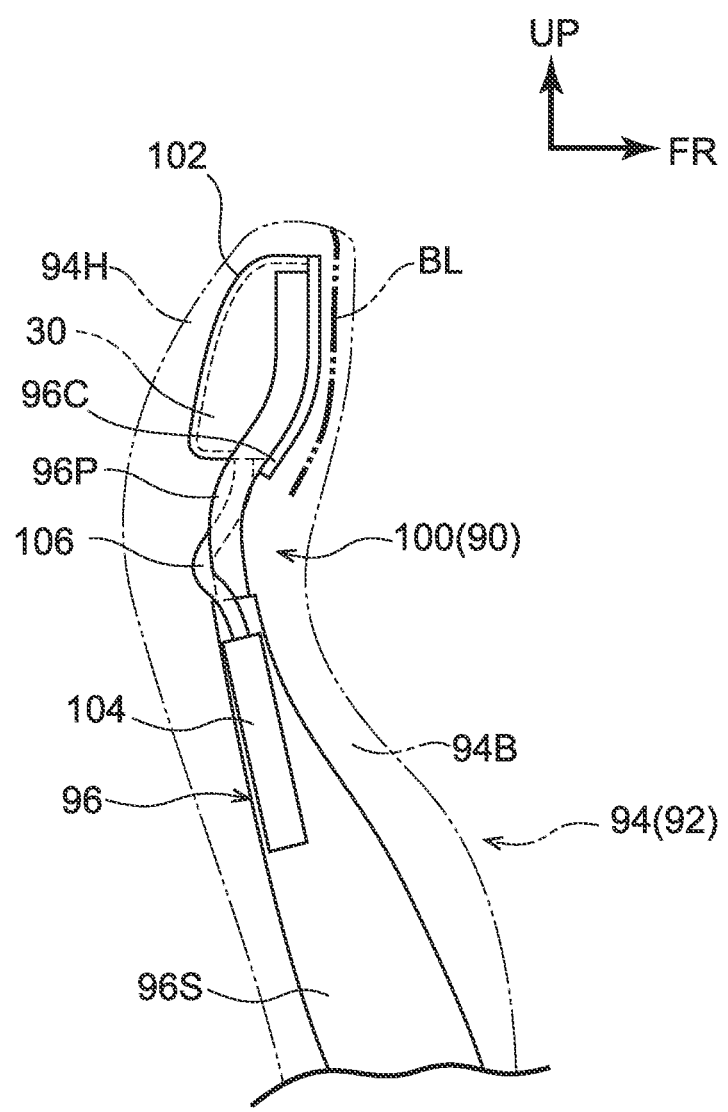

OCCUPANT PROTECTION DEVICE

TECHNICAL FIELD

The present disclosure relates to an occupant protection device.

BACKGROUND ART

Airbag devices are known in which gas from an inflator is supplied through a gas supply pipe fixed to a seatback to a bag attached to the gas supply pipe, and the bag is inflated so as to surround an occupant from the front and the side in a collision (see Patent Document 1: Japanese Patent Application Laid-Open (JP-A) No. 2000-344044). Airbag devices are also known in which head airbags protrude out from left and right end portions of a seat headrest in a forward direction, and join up in front of the head of an occupant, and an auxiliary head airbag protrudes out in a forward direction from a central portion of the seat headrest and joins up with the pair of head airbags (see Patent Document 2: JP-A No. 2013-018378).

SUMMARY OF INVENTION

Technical Problem

In the configuration of Patent Document 1, the gas supply pipe is provided projecting out above the seatback, and so the appearance is unattractive and the gas supply pipe becomes a hindrance when operating the vehicle seat. These issues are resolved by a configuration in which the head airbags are housed inside the headrest, as described in Patent Document 2. In the configuration of Patent Document 2, it is difficult to secure joint strength between the pair of head airbags that join up after inflation and deployment, and difficult to secure joint strength of the auxiliary head airbag with respect to the pair of head airbags.

An object of the present disclosure is to obtain an occupant protection device capable of inflating and deploying an airbag housed in a headrest or in a seatback so as to effectively protect an occupant against collisions from plural directions.

Solution to Problem

An occupant protection device according to a first aspect includes an airbag that inflates and deploys from a state of being housed in a headrest or seatback on receipt of supplied gas. The airbag is configured as an integral bag body to surround the head of the occupant with a front deployment section and a pair of left and right lateral deployment sections. The front deployment section includes a front inflating portion that inflates and deploys to a seat forward direction of the head of the occupant and of at least one of a shoulder or chest of the occupant. Each of the pair of left and right lateral deployment sections includes a lateral inflating portion that is connected to the front deployment section and that inflates and deploys alongside the head of the occupant.

In this occupant protection device, the airbag is housed in the headrest or seatback. On receipt of supplied gas in the event of a collision, the airbag inflates and deploys from the headrest or seatback. The front deployment section configuring the airbag inflates and deploys to the seat forward direction of the head of the occupant and of at least one of a shoulder or chest of the occupant. The pair of left and right lateral deployment sections configuring the airbag inflate and deploy at both the left and right alongside the head of the occupant.

Note that since the airbag is configured as an integral bag body to surround the head of the occupant with the front deployment section and the pair of left and right lateral deployment sections connected to the front deployment section, the airbag is capable of limiting movement of the occupant (restraining the occupant) in various collision modes, enabling the occupant to be protected. For example, in a frontal collision, the head and upper body (shoulders and chest) of the occupant are restrained mainly by the front deployment section, and in a side-on collision, the head of the occupant is restrained mainly by the left and right lateral deployment sections. Moreover, in an oblique collision for example, the head and upper body of the occupant are restrained from diagonally in front by the front deployment section and the lateral deployment sections. Moreover, in this occupant protection device, since the airbag is configured as an integral bag body, the occupant can be restrained with a more sufficient restraint force than in configurations in which plural airbags are joined together in order to restrain the occupant.

Accordingly, in the configuration of the present aspect, the airbag housed inside the headrest or seatback is capable of inflating and deploying so as to effectively protect the occupant against collisions from plural directions.

In the above aspect, configuration may be made wherein the front inflating portion is partitioned from each of the lateral inflating portions by a vertically-extending non-inflating portion, and the front inflating portion is configured so as to inflate and deploy earlier than the lateral inflating portions.

In this occupant protection device, the non-inflating portion is disposed between the front inflating portion of the front deployment section and each of the lateral inflating portions of the lateral deployment sections, and the front inflating portion is configured so as to inflate and deploy earlier than the lateral inflating portion. Accordingly, first, the front inflating portion of the airbag inflates and deploys so as to approach the head from the seat forward direction, after which the left and right lateral inflating portions inflate and deploy so as to approach the head from both the left and right sides. In other words, the front deployment section and the lateral deployment sections approach the head of the occupant in stages due to the inflation and deployment of the respective inflating portions during an inflation and deployment process of the airbag. The airbag is suppressed from impinging on the head during the inflation and deployment process, and approaches the head of the occupant after inflation and deployment has been completed, thereby improving occupant protection performance.

In the above aspect, configuration may be made wherein the lateral inflating portions inflate and deploy on receipt of supplied gas from the front inflating portion.

In this occupant protection device, gas is supplied to the lateral inflating portions through the front inflating portion. Accordingly, the front inflating portion of the airbag inflates and deploys to the seat forward direction of the head of the occupant and the like, followed by which the lateral inflating portions inflate and deploy alongside the head of the occupant. Namely, a configuration in which the front inflating portions inflate and deploy earlier than the lateral inflating portion can be obtained by a simple configuration.

In the above aspect, configuration may be made wherein the lateral inflating portions are configured such that, in an inflated and deployed state of the lateral inflating portions having received supplied gas, lower ends of the lateral inflating portions contact the shoulders of the occupant from above.

In this occupant protection device, the airbag is positioned in the vertical direction with respect to the occupant by the lower ends of the lateral inflating portions configuring the lateral deployment sections contacting the shoulders of the occupant from above. This thereby enables the airbag to be inflated and deployed at an appropriate position in the vertical direction regardless of the physical build and the seating posture of the occupant. This also improves the occupant protection performance of the airbag.

In the above aspect, configuration may be made further including a three-point type seatbelt device to restrain a waist of the occupant with a lap belt and to restrain the upper body of the occupant with a shoulder belt. The front inflating portion may be configured including a first shoulder restraint portion that, upon receipt of supplied gas, inflates and deploys to the seat forward direction of the shoulder on a shoulder belt-restrained side of the occupant, and a second shoulder restraint portion that, upon receipt of supplied gas, inflates and deploys closer to the occupant than the first shoulder restraint portion to the seat forward direction of the shoulder on the non-shoulder belt-restrained side of the occupant.

In this occupant protection device, the occupant is restrained in a vehicle seat by the lap belt and the shoulder belt. Note that the first shoulder restraint portion of the front deployment section inflates and deploys to the seat forward direction of the shoulder on the side of the occupant with the shoulder belt, and the second shoulder restraint portion of the front deployment section inflates and deploys to the seat forward direction of the shoulder on the non-shoulder belt-restrained side of the occupant. Since the second shoulder restraint portion inflates and deploys closer to the shoulder than the first shoulder restraint portion, the shoulder on the non-shoulder belt-restrained side of the occupant is restrained with a stronger restraint force than the restraint force of the first shoulder restraint portion.

In the above aspect, configuration may be made wherein a capacity of the second shoulder restraint portion is greater than a capacity of the first shoulder restraint portion.

In this occupant protection device, since the capacity of the second shoulder restraint portion is greater than that of the first shoulder restraint portion, the shoulder on the non-shoulder belt-restrained side of the occupant can be restrained with a stronger restraint force than the restraint force of the first shoulder restraint portion using a simple configuration.

In the above aspect, configuration may be made wherein the front inflating portion is configured including an upper body restraint portion that inflates and deploys to the seat forward direction of at least one of the shoulder or chest of the occupant. The occupant protection device may further include a coupling cloth that deploys in a state of coupling the upper body restraint portion to either the headrest or seatback, and that has a stretch ratio equivalent to or less than that of the airbag.

In this occupant protection device, in an inflated and deployed state of the airbag, the upper body restraint portion of the front inflating portion is coupled to the headrest or seatback by the coupling cloth. Accordingly, movement of the upper body restraint portion toward the seat forward direction accompanying restraint of the occupant by the upper body restraint portion is effectively limited, thus improving the occupant protection performance in various frontal collision modes.

In the above aspect, configuration may be made wherein the airbag further includes a duct portion that inflates and deploys from the headrest or seatback toward the seat forward direction and above the head of the occupant, and that supplies gas to the front inflating portion.

In this occupant protection device, gas is supplied to the front inflating portion through the duct portion that inflates and deploys over the head of the occupant. Accordingly, the airbag inflates and deploys toward the seat forward direction accompanying the flow of gas to the duct portion, facilitating inflation and deployment in a manner that passes over the head of the occupant.

In the above aspect, configuration may be made wherein the airbag is housed inside the headrest or seatback in a state in which a portion of the airbag including the front inflating portion and the duct portion is folded up in an outwardly rolled shape from a front end side toward a seat upper side and rear side.

In this occupant protection device, during a process in which gas is supplied to the front inflating portion through the duct portion that inflates and deploys over the head of the occupant, the airbag inflates and deploys as its outward rolling unfolds. The outwardly rolled shape of the airbag unfolds upward, namely toward the opposite side to the head, thereby further facilitating inflation and deployment of the airbag in a manner that passes over the head of the occupant while inflating and deploying toward the seat forward direction accompanying the flow of gas to the duct portion.

In the above aspect, configuration may be made further including a guide cloth that is configured with a lower coefficient of friction with respect to the airbag than a vehicle ceiling material, and that deploys from an upper portion of the headrest or seatback earlier than the airbag inflates and deploys.

In this occupant protection device, the guide cloth inflates and deploys earlier than the airbag accompanying deployment of the airbag. The guide cloth has a lower coefficient of friction with respect to the airbag than the vehicle ceiling material, thereby enabling the airbag to be deployed smoothly.

In the above aspect, configuration may be made further including a module case that is disposed to a seat rearward direction of a headrest body configuring the headrest, and that houses the airbag in a folded-up state and houses an inflator for supplying gas to the airbag.

In this occupant protection device, the module case in which the airbag and the inflator are housed is disposed to the rearward direction of the headrest. Accordingly, constraints resulting from the structure of the vehicle seat are less likely to be encountered than in a configuration in which the airbag and the inflator are housed inside a seatback, for example. In other words, the airbag including the front deployment section and the lateral deployment sections can be housed inside the headrest without heavy modification to the structure of the vehicle seat.

In the above aspect, configuration may be made wherein the module case is configured to jut out upward of and to both seat width direction sides of the headrest.

In this occupant protection device, the module case juts out upward of and to both seat width direction sides of the headrest, thereby enabling the airbag to be deployed toward the seat forward direction from the jutting-out portion. This thereby enables inflation and deployment of the airbag to be completed in a shorter time than in a configuration in which, for example, an airbag passes around from a back face of a headrest and deploys toward the seat forward direction.

In the above aspect, configuration may be made wherein the module case includes a rear wall having an upper end projecting out further upward than the headrest and tilting forward, the rear wall being configured to function as a support wall to support the airbag from the seat rearward direction during an inflation and deployment process.

In this occupant protection device, during the inflation and deployment process of the airbag, a reaction force is supported from the rearward direction by the support wall of the module case, such that the airbag deploys toward the seat forward direction. Namely, the airbag can be caused to inflate and deploy in a more appropriate manner (position, shape) than in a configuration that does not include (the functionality of) a support wall.

In the above aspect, configuration may be made wherein the module case includes a rear wall having an upper end projecting out further upward than the headrest and tilting forward, the rear wall being configured to function as a guide wall to guide the airbag toward the seat forward direction during an inflation and deployment process.

In this occupant protection device, during the inflation and deployment process of the airbag, the airbag is guided upward by the guide wall of the module case, such that the airbag deploys toward the seat forward direction while passing over the head of the occupant. Namely, the airbag can be caused to inflate and deploy in a more appropriate manner (path) than in a configuration that does not include the (functionality of) the guide wall.

In the above aspect, configuration may be made wherein a stay of the headrest is formed in a crank shape such that an upper portion of the stay is positioned further toward the seat forward direction than a lower portion of the stay, and the airbag is housed to the rearward direction of the upper portion of the stay.

In this occupant protection device, the airbag can be housed in a large space to the rearward direction of the upper portion of the crank-shaped stay. Moreover, since the airbag is disposed in a folded-up state close to the head of the occupant, the airbag can be caused to inflate and deploy in a manner surrounding the head of the occupant within a short time.

In the above aspect, configuration may be made further including a side airbag that inflates and deploys alongside the upper body of the occupant upon receipt of supplied gas. Configuration may be made wherein the airbag does not overlap with the side airbag in side view in a non-restraining inflated and deployed state of the airbag and a non-restraining inflated and deployed state of the side airbag.

In this occupant protection device, in the event of a side-on collision, for example, the head of the occupant can be restrained from the side by the lateral deployment sections of the airbag, and the upper body of the occupant can be restrained from the side by the side airbag. The airbag does not overlap with the side airbag in side view in a non-restraining inflated and deployed state, thereby preventing or effectively suppressing any drop in the occupant protection performance arising due to interference between the airbag and the side airbag.

In the above aspect, configuration may be made wherein the side airbag is respectively provided at side sections on both seat width direction sides of the seatback.

This occupant protection device enables the occupant to be protected against a side-on collision, even when the vehicle seat is disposed reversed in the front-rear direction.

In the above aspect, configuration may be made wherein the side airbag is provided at an outer side section at a vehicle width direction outer side of the seatback. The occupant protection device may further include a first inflator that is supported by a frame at an inner side of the outer side section, and that supplies gas to the side airbag, and a second inflator that is supported by a frame at an inner side of an inner side section at a vehicle width direction central side of the seatback, and that supplies gas to the airbag.

In this occupant protection device, the first inflator that supplies gas to the side airbag is supported by the frame at the seat width direction outer side, and the second inflator that supplies gas to the airbag is supported by the frame at the inner side of the inner side section at the vehicle width direction central side of the seatback. The plural inflators accordingly have good mounting characteristics with respect to the seatback.

In the above aspect, configuration may be made wherein the airbag is housed in a seatback including an integral headrest.

In this occupant protection device, using a simple structure, the second inflator for the airbag can be supported with sufficient strength on a seatback with an integral headrest that is not provided with a frame along the seat width direction between the seatback and the headrest.

In the above aspect, configuration may be made wherein the front deployment section is configured including a see-through structure provided at a portion positioned in front of the head of the occupant and allowing the occupant to see an area at the front side of the front deployment section.

In this occupant protection device, the occupant is able to see an area (vehicle cabin and vehicle exterior) in front of the front deployment section through the see-through structure both when being protected by the airbag and after having been protected by the airbag.

Advantageous Effects of the Invention

As described above, in the occupant protection device according to the present disclosure, the airbag housed inside the headrest or seatback inflates and deploys so as to exhibit the excellent advantageous effect of enabling the occupant to be effectively protected against collisions from plural directions.

BRIEF DESCRIPTION OF DRAWINGS

FIG. 5 is a partially cut-away enlarged side view schematically explaining an inflation and deployment process of a multidirectional airbag configuring an occupant protection device according to the first exemplary embodiment.

FIG. 9A is a back face view illustrating relevant portions of an occupant protection device according to a third exemplary embodiment, as viewed when a cushion member and covering material of a seatback have been removed.

FIG. 9B is a side view illustrating relevant portions of an occupant protection device according to the third exemplary embodiment, as viewed when a cushion member and covering material of a seatback have been removed.

DESCRIPTION OF EMBODIMENTS

First Exemplary Embodiment

Figure 1:
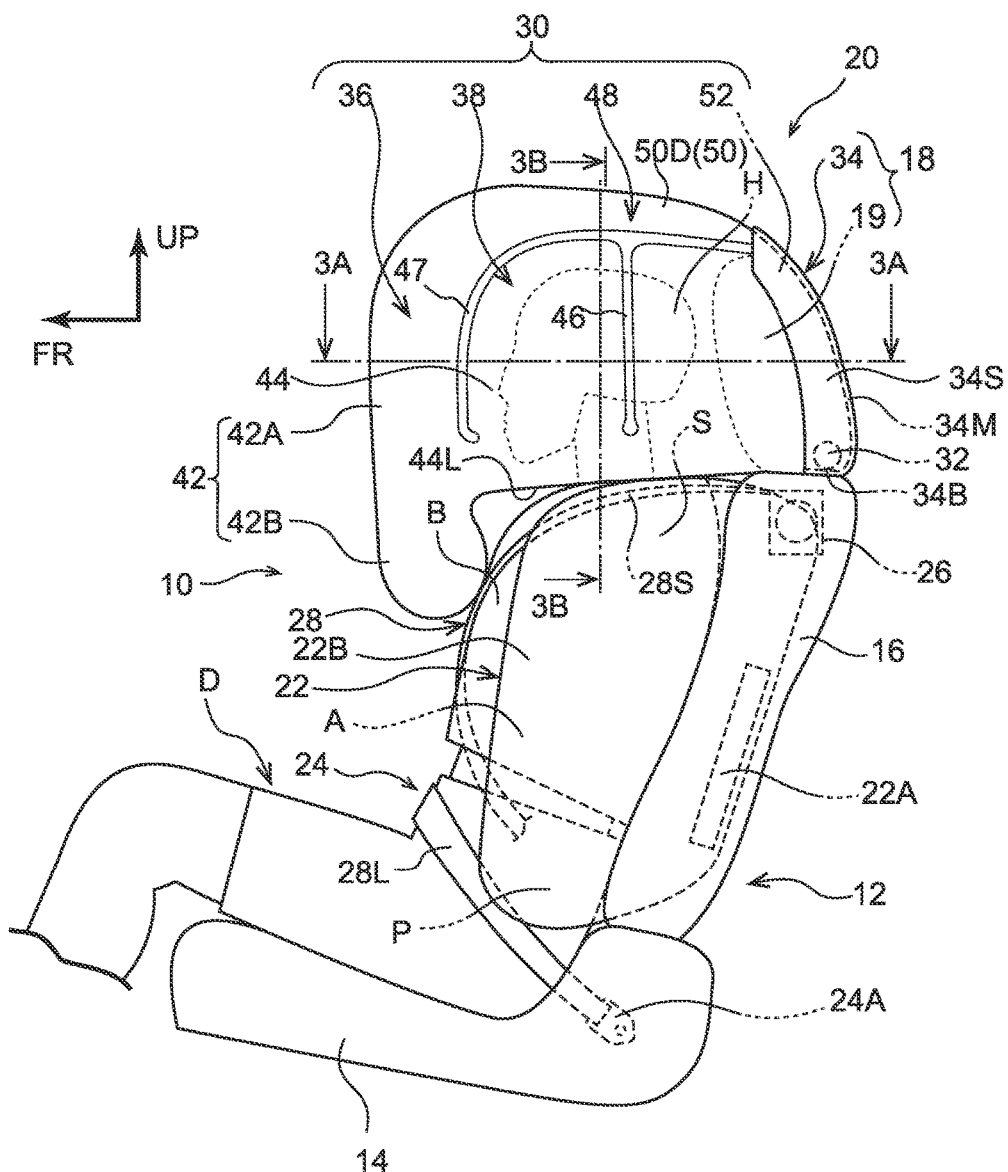
FIG. 1 is a side view schematically illustrating a seated occupant protection mode of an occupant protection device according to a first exemplary embodiment.

Explanation follows regarding an occupant protection device 10 according to a first exemplary embodiment, with reference to FIG. 1 to FIG. 6. Note that in the drawings, the arrow FR and the arrow UP respectively indicate a front direction (the direction in which a seated occupant faces) and an upper direction of a vehicle seat 12 as appropriate. In the following explanation, unless specifically indicated, reference simply to the front and rear, up and down, and left and right directions indicates the front and rear in a seat front-rear direction, up and down in a seat vertical direction, and left and right when facing forward in the seat front-rear direction. Note that in the drawings, the arrow IN indicates the vehicle central side in the vehicle width direction as appropriate, in an automobile serving as the vehicle installed with the vehicle seat 12.

Schematic Overall Configuration of Occupant Protection Device

Figure 2:
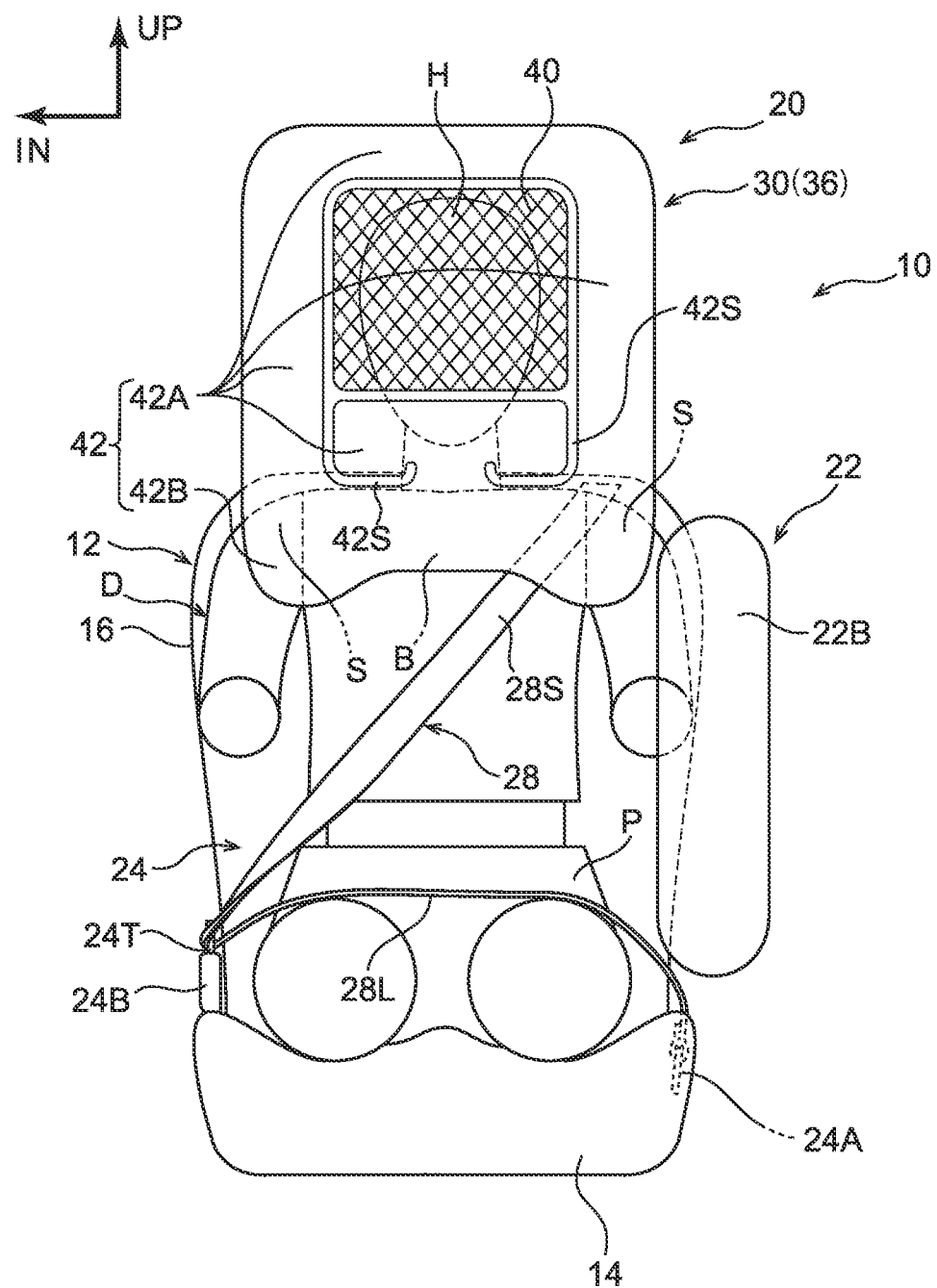
FIG. 2 is a front view schematically illustrating a seated occupant protection mode of an occupant protection device according to the first exemplary embodiment.

As illustrated in FIG. 1, FIG. 2, and FIG. 4, the occupant protection device 10 is installed to the vehicle seat 12. The vehicle seat 12 is disposed offset to either the left or the right with respect to a vehicle width direction center of a vehicle body of the automobile, not illustrated in the drawings (on the left side in the present exemplary embodiment). In the vehicle seat 12, the seat front-rear direction matches the front-rear direction of the vehicle, and a seat width direction matches a width direction of the vehicle. The vehicle seat 12 is configured including a seat cushion 14, a seatback 16 of which a lower end is coupled to a rear end of the seat cushion 14, and a headrest 18 provided at an upper end of the seatback 16.

As illustrated in FIG. 5, the headrest 18 is configured including a headrest body 19 that is attached to the seatback 16, and a module case 34 (described later), functioning as a back board configuring a rear design portion of the headrest 18. The headrest body 19 is attached to the seatback 16 through headrest stays 18S. Each headrest stay 18S is configured such that an upper portion 18SU is positioned forward with respect to a lower portion 18SL that is supported by the seatback 16, and the lower portion 18SL and the upper portion 18SU are coupled together by a sloped intermediate portion 18SC.

FIG. 1, FIG. 2, FIG. 4, and so on illustrate a crash test dummy (doll) D, serving as a model of an occupant to be protected, in a state seated on the seat cushion 14 of the vehicle seat 12. The dummy D is, for example, a World Side Impact Dummy (World SID) of a 50th percentile American adult male (AM50). The dummy D is seated in a standard seated posture specified in crash testing methods, and the vehicle seat 12 is positioned in a reference setting position corresponding to the seated posture. In the interest of simplicity of explanation, the dummy D is hereafter referred to as the "seated occupant D".

The occupant protection device 10 is configured including a multidirectional airbag device 20 for protecting the seated occupant D in various collision modes, a side airbag device 22, and a seatbelt device 24. Schematic configurations of the seatbelt device 24 and the side airbag device 22 are described below, following which detailed explanation is given regarding configuration of the multidirectional airbag device 20.

The seatbelt device 24 is a three-point type seatbelt device, in which one end of a belt (webbing) 28 is taken up on a retractor 26 so as to be capable of being pulled out, and the other end of the belt 28 is fixed to an anchor 24A. The belt 28 is provided with a slidable tongue plate 24T, and the belt 28 is worn by the seated occupant D by anchoring the tongue plate 24T to a buckle 24B. Configuration is such that, in a state in which the belt 28 is being worn by the seated occupant D, a shoulder belt 28S of the belt 28 spanning from the retractor 26 to the tongue plate 24T is worn over the upper body of the seated occupant D, and a lap belt 28L of the belt 28 spanning from the tongue plate 24T to the anchor 24A is worn over the waist P of the seated occupant D.

In the present exemplary embodiment, the seatbelt device 24 is configured as what is referred to as a belt-in-seat device in which the retractor 26, the anchor 24A, and the buckle 24B are provided to the vehicle seat 12. Moreover, in the present exemplary embodiment, the retractor 26 includes a pre-tensioner function that forcibly takes up the belt 28 when actuated. The pre-tensioner function of the retractor 26 is actuated by an ECU 60, described later.

The side airbag device 22 is configured including an inflator 22A and a side airbag 22B. The side airbag device 22 is housed in a side section on the vehicle width direction outer side of the seatback 16, with the side airbag 22B in a folded state. On actuation, the inflator 22A generates gas inside the side airbag 22B. Configuration is such that this gas causes the side airbag 22B to protrude out from a side section of the seatback 16 in the forward direction, and inflate and deploy to the vehicle width direction outer side of the seated occupant D. In the present exemplary embodiment, the side airbag 22B is configured to inflate and deploy at the vehicle width direction outer side of the waist P, abdomen A, chest B, and shoulders S of the seated occupant D.

Multidirectional Airbag Device Configuration

Figure 4A:
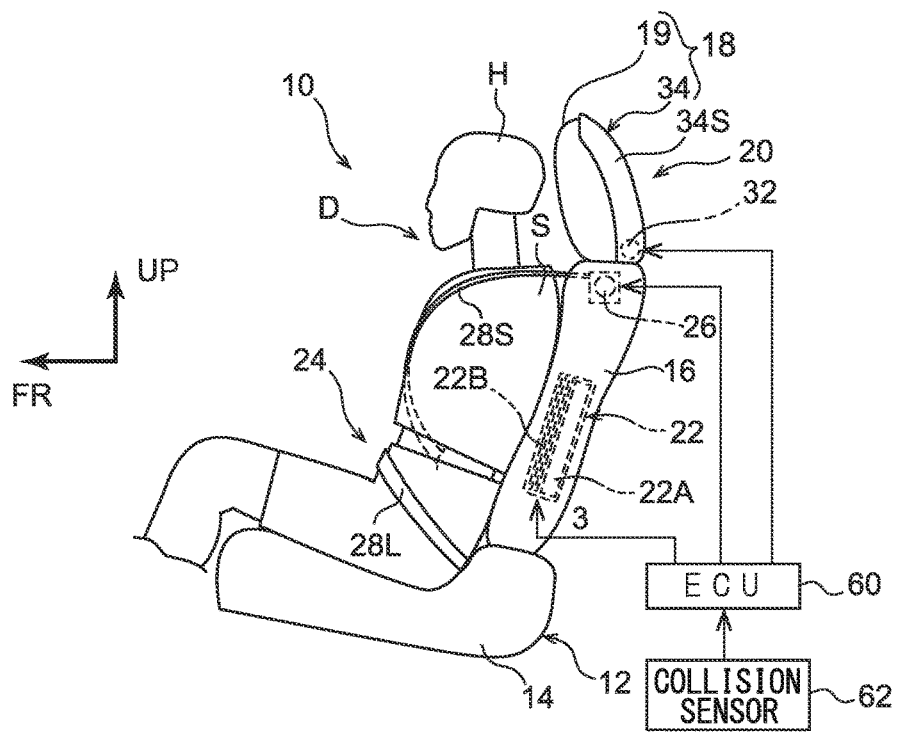
FIG. 4A is a side view illustrating a schematic overall configuration of an occupant protection device according to the first exemplary embodiment prior to actuation.

As illustrated in FIG. 1 and FIG. 4A, the multidirectional airbag device 20 is configured including a multidirectional airbag 30, serving as an airbag, an inflator 32, and the module case (also referred to as an airbag case) 34. The multidirectional airbag 30 is housed inside the module case 34 folded in a state connected to the inflator 32 in a manner capable of being supplied with gas, as described later. The multidirectional airbag device 20 that is modularized in this manner is provided in the headrest 18, above the seatback 16. Specific explanation follows thereof.

Multidirectional Airbag

As illustrated in top-down cross-section in FIG. 3A, the multidirectional airbag 30 is configured as an integral bag body that inflates and deploys so as to surround the head H of the seated occupant D (also referred to below as simply the "head H") from the forward direction and from both left and right sides. More specifically, as illustrated in FIG. 1 to FIG. 3, the multidirectional airbag 30 is configured including a front deployment section 36 that inflates and deploys to the forward direction of the head H, and a pair of lateral deployment sections 38 that inflate and deploy at both the left and right sides of the head H.

The front deployment section 36 is configured including a mesh portion 40, serving as a see-through structure, that deploys in front of the head H, and a front inflating portion 42 that inflates and deploys surrounding the mesh portion 40 as viewed from the front. The mesh portion 40 is formed in a substantially rectangular shape as viewed from the front, and inner peripheral edges of the front inflating portion 42 form the shape of a rectangular frame that is joined to the mesh portion 40. The front inflating portion 42 inflates and deploys on receipt of supplied gas.

As illustrated in FIG. 2, on the front inflating portion 42, a part mainly above the seatback 16 and surrounding the mesh portion 40 configures a first inflating portion 42A that inflates and deploys to the forward direction of the head H. A portion of the front inflating portion 42 positioned below the first inflating portion 42A (overlapping with the seatback 16 as viewed from the front) configures a second inflating portion 42B, and serves as an upper body restraint portion that inflates and deploys to the forward direction of the chest B, the shoulders S, and the head H of the seated occupant D. The second inflating portion 42B is supplied with gas through the first inflating portion 42A. In the present exemplary embodiment, a portion of the first inflating portion 42A positioned below the mesh portion 40 is partitioned from other portions of the first inflating portion 42A by seams 42S, and is supplied with gas through the second inflating portion 42B.

The lateral deployment sections 38 are each configured including a lateral inflating portion 44 that inflates and deploys alongside the head H on receipt of supplied gas, and a seam portion 46, serving as a non-inflating portion, that extends along the vertical direction so as to partition the lateral inflating portion 44 to the front and rear. As illustrated in FIG. 1, each lateral inflating portion 44 has a size (surface area) that overlaps the entire head H, as viewed from the side, and the seam portion 46 partitions the lateral inflating portion 44 to the front and rear at a portion of the lateral inflating portion 44 overlapping with the head H.

Front ends of the left and right lateral inflating portions 44 are respectively connected in a communicated state with corresponding left and right lower ends of the first inflating portion 42A of the front inflating portion 42 (in the vicinity of a boundary with the second inflating portion 42B). The left and right lateral inflating portions 44 are thereby supplied with gas from the inflator 32 through the front inflating portion 42. Portions above the communicated portions mentioned above between the first inflating portion 42A of the front inflating portion 42 and the lateral inflating portions 44 are partitioned from each other by seam portions 47, serving as non-inflating portions.

Figure 3A:
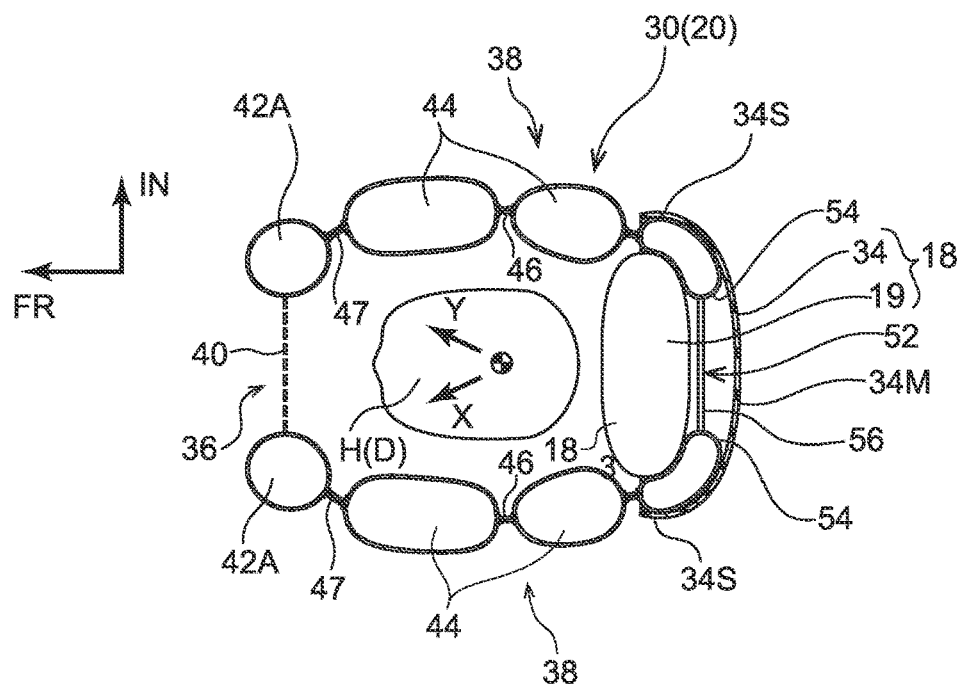
FIG. 3A is a cross-section taken along line 3A-3A in FIG. 1, illustrating a fully inflated and deployed state of a multidirectional airbag configuring an occupant protection device according to the first exemplary embodiment.
Figure 3B:
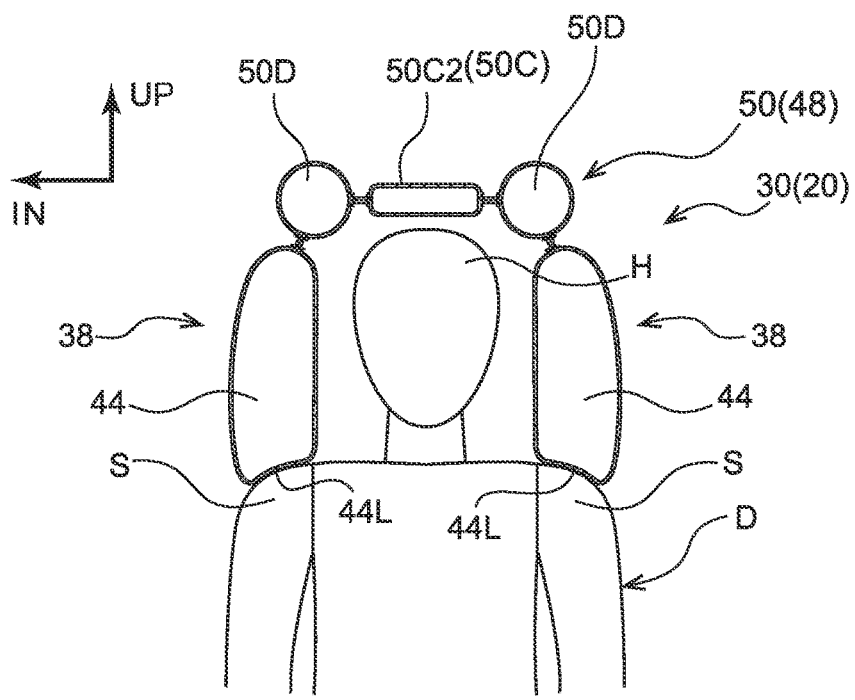
FIG. 3B is a cross-section taken along line 3B-3B in FIG. 1, illustrating a fully inflated and deployed state of a multidirectional airbag configuring an occupant protection device according to the first exemplary embodiment.

As illustrated in FIG. 3B, in a fully inflated and deployed state of the multidirectional airbag 30, lower ends 44L of the respective lateral inflating portions 44 of the left and right lateral deployment sections 38 contact the shoulders S of the seated occupant D from above. Configuration is made such that the contact of the shoulders S by the lower ends 44L of the lateral inflating portions 44 positions the fully inflated and deployed multidirectional airbag 30 in the vertical direction with respect to (the head H of) the seated occupant.

In this positioned state, the multidirectional airbag 30 is configured such that none of the front deployment section 36, the left and right lateral deployment sections 38, nor an upper deployment section 48, described later, contact the head H of the seated occupant D (gaps are formed) when in a normal seated posture.

As illustrated in FIG. 1, the multidirectional airbag 30 includes the upper deployment section 48 that is connected to respective upper edges of the front deployment section 36 and the left and right lateral deployment sections 38, and that deploys above the head H of the seated occupant D. A main section of the upper deployment section 48 is configured by an upper inflating portion 50 that inflates and deploys on receipt of supplied gas. As illustrated in FIG. 3B, the upper inflating portion 50 is configured including a central inflating portion 50C that inflates and deploys above the head H, and a pair of upper duct portions 50D, serving as duct portions, that extend along the front-rear direction at the left and right of the central inflating portion 50C.

Figure 6:
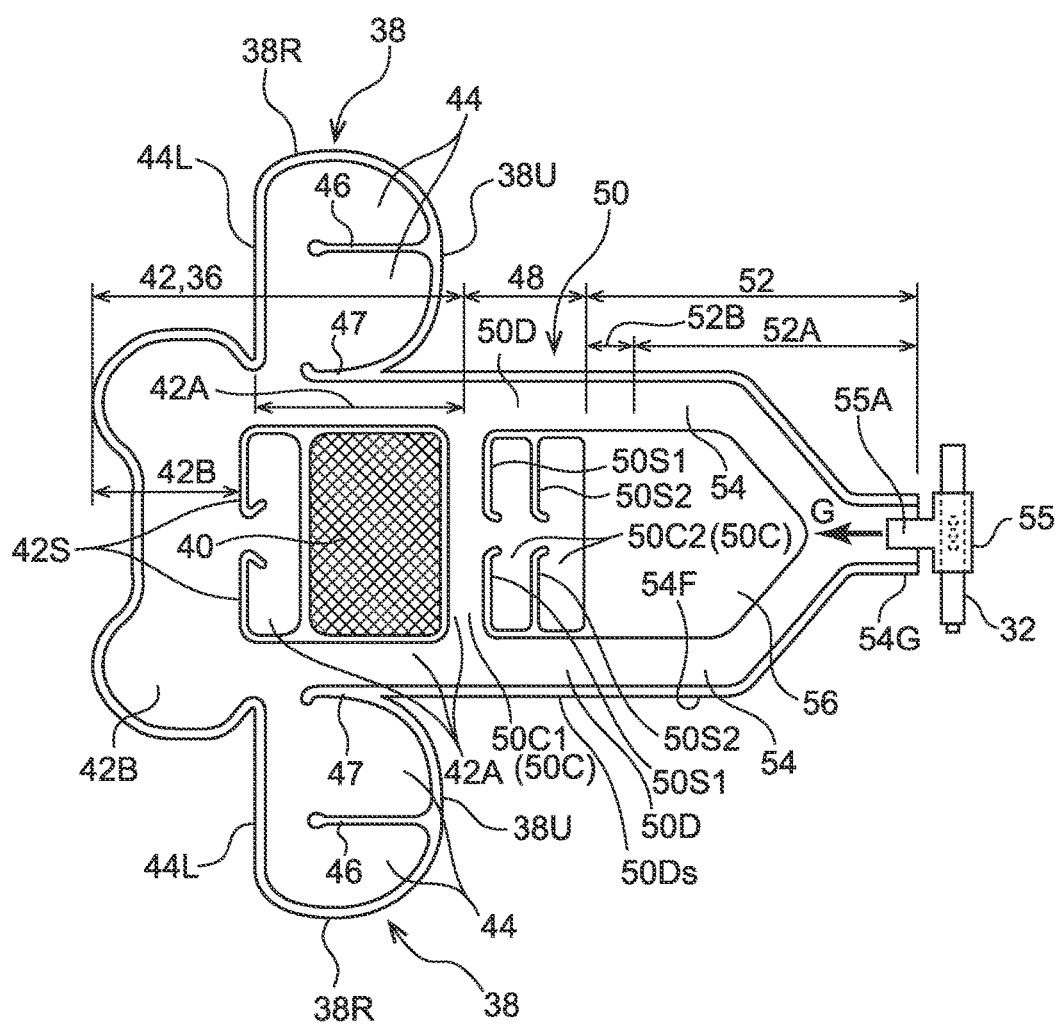
FIG. 6 is a diagram illustrating a flat pattern of a multidirectional airbag configuring an occupant protection device according to the first exemplary embodiment.

As illustrated as a flat pattern in FIG. 6, the central inflating portion 50C includes an inflating portion 50C1 that is common to a portion configuring an upper edge of the front inflating portion 42, and inflating portions 50C2 that are partitioned from the inflating portion 50C1 by seam portions 50S1 in a manner allowing gas to flow therebetween. The inflating portions 50C2 are partitioned into front and rear by seam portions 50S2 in a manner allowing gas to flow therebetween. Both left and right ends of the inflating portion 50C1 are in communication with the upper duct portions 50D, and a seat width direction central portion of a rear edge of the inflating portion 50C1 is in communication with the inflating portions 50C2. Front ends of the left and right upper duct portions 50D are in communication with both left and right side edges of an upper end of the front inflating portion 42.

The multidirectional airbag 30 includes a rear deployment section 52 that deploys to the rearward direction of the upper deployment section 48. The rear deployment section 52 is configured including rear duct portions 54, these being inflating portions, and a non-inflating portion 56. The rear duct portions 54 are isolated from each other to the left and right, and upper ends thereof are respectively connected in a communicated state to the corresponding left and right upper duct portions 50D. The left and right rear duct portions 54 are coupled together by the non-inflating portion 56, a front edge of which is joined to a rear edge of the central inflating portion 50C.

The left and right rear duct portions 54 merge below (on the right side of in FIG. 6) the non-inflating portion 56 that forms a pentagonal shape, thereby forming a gas entry portion 54G. As illustrated in FIG. 6, the gas entry portion 54G is connected so as to be capable of being supplied with gas from the inflator 32 through a T-shaped diffuser 55 (see the arrow G). Namely, a gas ejection end 55A of the diffuser 55 is inserted inside the gas entry portion 54G in an airtight state. Note that that is no limitation to a configuration employing the diffuser 55. For example, part of an upright inflator 32 that includes a gas outlet may be inserted into the gas entry portion 54G. Alternatively, for example, the gas entry portion 54G may be configured bent into an L-shape, and part of a horizontal inflator 32 that includes a gas outlet may be inserted into the gas entry portion 54G.

The rear deployment section 52 configured as described above may be split into a base portion 52A that inflates and deploys to the rearward direction of the headrest 18, and a coupling portion 52B that inflates and deploys above the headrest 18 (see the flat pattern in FIG. 6). A lower end of the base portion 52A is supported by the seatback 16 through the inflator 32 and the diffuser 55, and the coupling portion 52B connects the base portion 52A and the upper deployment section 48 together in a communicated state.

As illustrated in FIG. 1, configuration is made such that in a non-restraining inflated and deployed state of the multidirectional airbag 30 in which the seated occupant D is not being restrained, as viewed from the side, the multidirectional airbag 30 is not superimposed with (does not overlap) the side airbag 22B when in a non-restraining inflated and deployed state in which the seated occupant D is not being restrained. In other words, the multidirectional airbag 30 and the side airbag 22B are configured so as not to include inflating and deploying portions that overlap each other when both are in non-restraining inflated and deployed states, at least as viewed from the side. Moreover, as illustrated in FIG. 2, in the non-restraining inflated and deployed state, the multidirectional airbag 30 is configured such that as viewed from the front, the multidirectional airbag 30 is not to be superimposed with the side airbag 22B in the non-restraining inflated and deployed state in which the seated occupant D is not restrained.

Prior to folding, the multidirectional airbag 30 that inflates and deploys in the manner described above is laid out in an opened out shape (flat pattern), as illustrated in FIG. 6. The multidirectional airbag 30 with this opened out shape is formed as a One Piece Woven (abbreviated to "OPW") integral bag body. Note that the multidirectional airbag 30 may be formed into an integral bag body by a method of sewing together (cutting and sewing) peripheral edges of two pieces of woven material.

In the multidirectional airbag 30, from the state illustrated in FIG. 6, an upper edge 38U of each lateral deployment section 38 is joined to a side edge 50Ds of the corresponding upper duct portion 50D by stitching or the like, and a rear edge 38R of each lateral deployment section 38 is joined to a front edge (edge running up and down along the page in FIG. 6) 54F of the corresponding rear duct portion 54 by stitching or the like. The multidirectional airbag 30 is folded up in this joined-together state, and housed inside the module case 34. The manner in which the multidirectional airbag 30 is folded will be described later, together with the configuration of a deployment guide cloth 58 and the configuration of the module case 34.

Inflator

A combustion type or cold gas type inflator is employed as the inflator 32, and gas generated on actuation is supplied inside the multidirectional airbag 30. In the present exemplary embodiment, the inflator 32 is configured by a cylinder type inflator, and is disposed inside the module case 34 with its length direction along the seat width direction. Actuation of the inflator 32 is controlled by the ECU 60, serving as a controller, described later.

Module Case

As illustrated in FIG. 1 and FIG. 5, the module case 34 is disposed to the rearward direction of the headrest body 19 above the seatback 16. In the present exemplary embodiment, the module case 34 is a back board configuring (a rear design portion of) the headrest 18. The multidirectional airbag 30 is therefore provided disposed inside (at the interior of) a rear portion of the headrest 18.

The module case 34 projects out further upward than an upper end of the headrest body 19 and juts out at both seat width direction sides of the headrest body 19, as viewed from the front. Namely, the module case 34 covers the headrest body 19 from the rearward direction. In the present exemplary embodiment, the module case 34 covers a rear portion of the headrest body 19 from above and from both left and right sides, and configures the rear design portion of the headrest 18 as described above.

More specifically, relevant portions configuring the module case 34 include a base portion 34B, a main wall 34M serving as a rear wall, and a pair of left and right side walls 34S that face each other in the seat width direction. The base portion 34B configures a fixing portion to the upper end of the seatback 16.

The main wall 34M extends out upward from a rear end of the base portion 34B, and is tilted forward such that an upper end of the main wall 34M is positioned further to the forward direction than a lower end of the main wall 34M that is fixed to the seatback 16. As viewed from the side, the main wall 34M configures a curved shape that is convex upward and rearward. As viewed from the front, the main wall 34M projects out further upward than the upper end of the headrest body 19, and juts out at both seat width direction sides of the headrest body 19.

A space in which the multidirectional airbag 30 is housed in a folded state is formed between the main wall 34M and the headrest body 19. The upper end of the main wall 34M reaches above the headrest body 19. Configuration is made such that the multidirectional airbag 30 passes between an upper end portion of the main wall 34M and the headrest body 19 during an inflation and deployment process. In the inflated and deployed state of the multidirectional airbag 30, the coupling portion 52B of the rear deployment section 52 passes between the upper end portion of the main wall 34M and the headrest body 19.

The pair of side walls 34S extend out from both seat width direction ends of the main wall 34M forward, and cover the rear portion of the headrest body 19, as viewed from the side. Configuration is made such that in the inflated and deployed state of the multidirectional airbag 30, the lateral deployment sections 38 (portions in the vicinity of boundaries with the rear deployment section 52) pass between the pair of side walls 34S and the headrest body 19.

The module case 34 described above houses the multidirectional airbag 30 in a folded state between the module case 34 and the headrest body 19. Moreover, the diffuser 55 described above is connected to the gas entry portion 54G of the multidirectional airbag 30 in an airtight state. Although not illustrated in the drawings, the inflator 32 to which the diffuser 55 is attached is fastened to a seatback frame in a state in which a stud bolt of the inflator 32 passes through the multidirectional airbag 30 and the base portion 34B of the module case 34. More specifically, the inflator 32 extends along the seat width direction of the seatback frame, and is fastened to and supported by a top frame spanning between upper ends of a pair of left and right side frames.

The multidirectional airbag 30 is rolled up outward and housed inside the module case 34. Namely, the multidirectional airbag 30 is housed inside the headrest 18 in a state folded up into an outwardly rolled shape. Rolling up outward (a state folded up into an outwardly rolled shape) refers to a mode of folding into a rolled-up shape from a front end side toward the upper side and rear side, so as to fold up in the opposite direction to that during the deployment process illustrated in FIG. 5. In other words, as illustrated by the hypothetical lines in FIG. 5, rolling up outward is a mode of folding in which a rolled-up portion 30R is positioned at the outside (opposite side to the head H side) in the deployment process of the multidirectional airbag 30. As described above, in the multidirectional airbag 30, in which the lateral deployment sections 38 are stitched to the upper deployment section 48 and the rear deployment section 52, the lateral deployment sections 38 are folded so as to be rolled inward at the stage at which the front deployment section 36 and the upper deployment section 48 are rolled up outward.

In the folded state, at least part of the multidirectional airbag 30 is disposed to the rearward direction of the upper portions 18SU and the intermediate portions 18SC of the headrest stays 18S of the headrest body 19. In the headrest body 19 of the present exemplary embodiment, a cushion member (pad) 18C is formed so as to thinner to the rearward direction of the upper portions 18SU and the intermediate portions 18SC of the headrest stays 18S, and a folded state airbag housing space is formed between the cushion member 18C and the module case 34. Configuration is such that when supplied with gas, the multidirectional airbag 30 is inflated and deployed from between the cushion member 18C and the module case 34 toward the outside of the module case 34.

The main wall 34M of the module case 34 is configured so as to support the multidirectional airbag 30 from the rearward direction (bear reaction force in order to direct forward) in the inflation and deployment process when this occurs. Since the main wall 34M of the module case 34 has a curved shape as viewed from the side as described above, the main wall 34M is configured to guide the multidirectional airbag 30 forward (forward and upward) in the inflation and deployment process when this occurs. Thus, the main wall 34M of the present exemplary embodiment functions as a supporting wall and a guiding wall.

The deployment guide cloth 58, serving as a guide cloth, is folded and housed together with the multidirectional airbag 30 inside the module case 34. Inside the module case 34, a base portion of the deployment guide cloth 58 disposed at the outside (the main wall 34M side) of the multidirectional airbag 30, which has been rolled up outward as described above, is connected to the inflator 32, or to a gas entry portion 54G side portion of the multidirectional airbag 30, this being a portion at a base end side of the multidirectional airbag 30. A leading end side of the deployment guide cloth 58 is disposed at the inside (the headrest body 19 side) of the outward rolled-up portion 30R of the multidirectional airbag 30, so as to cover the rolled-up portion 30R in the opposite direction (the counterclockwise direction in FIG. 5) to the rolling direction (the clockwise direction in FIG. 5).

As illustrated by the hypothetical lines in FIG. 5, the deployment guide cloth 58 is led out of the module case 34 accompanying inflation and deployment (undoing the rolling) of the multidirectional airbag 30, and the deployment guide cloth 58 is deployed earlier than the multidirectional airbag 30, between the multidirectional airbag 30 and a vehicle cabin ceiling. The deployment guide cloth 58 has a smaller coefficient of friction with respect to the multidirectional airbag 30 than a ceiling material of the automobile installed with the occupant protection device 10. In the present exemplary embodiment, a face on the vehicle cabin ceiling side of the deployment guide cloth 58 is silicone coated, and a face of the deployment guide cloth 58 that contacts the multidirectional airbag 30 is configured as a low friction face that is not silicone coated.

Figure 4B:
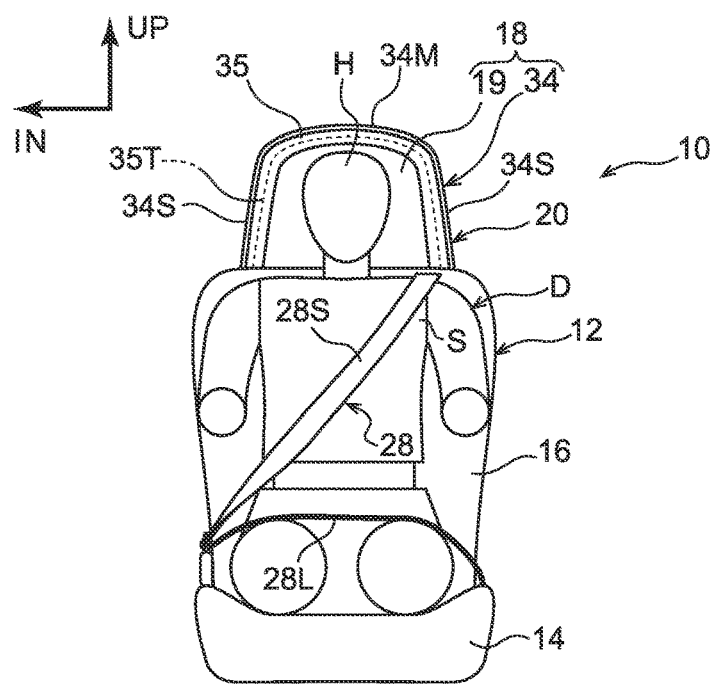
FIG. 4B is a front view illustrating a schematic overall configuration of an occupant protection device according to the first exemplary embodiment prior to actuation.

As illustrated in FIG. 4B, as viewed from the front, a space between the module case 34 and the headrest body 19 is closed off by an airbag door 35. The airbag door 35 is configured so as to split open about a tear line 35T, this being a weakened portion, under deployment pressure of the multidirectional airbag 30, thereby allowing the multidirectional airbag 30 to inflate and deploy forward.

ECU Configuration

As illustrated in FIG. 4A, the multidirectional airbag device 20, the side airbag device 22, and the seatbelt device 24 configuring the occupant protection device 10 are controlled by the ECU 60, serving as a controller. Specifically, the inflator 32 of the multidirectional airbag device 20, the inflator 22A of the side airbag device 22, and the retractor 26 (pre-tensioner function) of the seatbelt device 24 are each electrically connected to the ECU 60. The ECU 60 is electrically connected to a collision sensor 62 (or sensor group).

Based on information from the collision sensor 62, the ECU 60 is capable of detecting or predicting (the occurrence or inevitability of) each collision mode out of various modes of frontal collision, described later, to the automobile to which it is installed. The ECU 60 is also capable of detecting or predicting (the occurrence or inevitability of) a side-on collision to the automobile to which it is installed based on information from the collision sensor 62.

When a side-on collision has been detected or predicted based on information from the collision sensor 62, the ECU 60 actuates the inflators 22A, 32. When a frontal collision has been detected or predicted based on information from the collision sensor 62, the ECU 60 actuates the inflator 32 and the retractor 26. Note that frontal collision modes in which the ECU 60 actuates the inflator 32 and the retractor 26 include full overlap frontal collisions, offset frontal collisions, and the like.

When, based on information from the collision sensor 62, the ECU 60 detects or predicts a frontal collision that is a frontal collision at a position offset toward one vehicle width direction side by a specific value or greater, the ECU 60 actuates the inflators 22A, 32 and the retractor 26. Such frontal collisions at a position offset toward one vehicle width direction side by a specific value or greater include oblique collisions, small overlap collisions, and the like.

Note that an oblique collision (MDB oblique collision) is, for example, defined by the NHTSA as an oblique collision from the front (such as a collision with a relative angle of 15° with the other party in the collision and with a vehicle width direction overlap amount of approximately 35%). In the present exemplary embodiment, as an example, an oblique collision at a relative speed of 90 km/hr is envisaged. A small overlap collision is, for example, defined by the IIHS as an automobile frontal collision in which a vehicle width direction overlap amount with the other party in the collision is 25% or less. For example, a collision at the vehicle width direction outer side of a front side member, this being a vehicle body frame, would correspond to a small overlap collision. In the present exemplary embodiment, as an example, a small overlap collision at a relative speed of 64 km/hr is envisaged.

Operation and Advantageous Effects

Next, explanation follows regarding operation of the first exemplary embodiment. First, explanation follows regarding operation when protecting a seated occupant in various collision modes, followed by explanation regarding other operation, such as deployment performance of the multidirectional airbag 30.

In a Side-on Collision

When the ECU 60 has detected or predicted a side-on collision based on information from the collision sensor 62, the ECU 60 actuates the inflators 22A, 32. Thus, as illustrated in FIG. 1 and FIG. 2, the side airbag 22B of the side airbag device 22 is inflated and deployed at the vehicle width direction outer side of the seated occupant D, and the multidirectional airbag 30 of the multidirectional airbag device 20 is inflated and deployed so as to surround the head H of the seated occupant D. A nearside side-on collision, explained below, is a side-on collision to a vehicle side face at the side nearest to the seated occupant D in the vehicle width direction. A far-side side-on collision is a side-on collision to a vehicle side face at the side furthest from the seated occupant D in the vehicle width direction. Thus, in cases in which the seated occupant D is an occupant of the driving seat, for example, a nearside side-on collision is a side-on collision at the driving seat side, and a far-side side-on collision is a side-on collision at a front passenger seat side.

Nearside Side-on Collisions

When a side-on collision has occurred on the vehicle width direction side installed with the vehicle seat 12, movement of the upper body of the seated occupant D toward a side door side is limited by the side airbag 22B, and movement of the head H of the seated occupant D toward a side window glass side is limited by the lateral deployment section 38 on the vehicle width direction outer side. Namely, the upper body and head H of the seated occupant D are restrained and protected in a side-on collision by the side airbag 22B and the lateral deployment section 38 on the vehicle width direction outer side.

In this manner, the occupant protection device 10 enables movement of the head H toward the collision side to be limited. Moreover, since the lateral deployment section 38 includes the lateral inflating portion 44, deformation of the lateral inflating portion 44 functions to absorb energy during the restraint process of the head H. For example, the peak load input to the head H can be kept small even when the head H moves as far as the side window glass.

Moreover, when the seated occupant D swings back after having been protected by the side airbag 22B and the lateral deployment section 38 on the vehicle width direction outer side, movement of the head H of the seated occupant D toward the non-collision side is limited by the lateral deployment section 38 on the vehicle width direction central side. Thus, for example, the head H of the seated occupant D is suppressed from impinging on the seatback of an adjacent seat or an occupant in the adjacent seat.

Far-Side Side-on Collisions

On the other hand, when a side-on collision has occurred on the vehicle width direction opposite side to the side installed with the vehicle seat 12, movement of the head H of the seated occupant D toward the collision side (the vehicle width direction central side) is limited by the lateral deployment section 38 on the vehicle width direction central side. Namely, the head H of the seated occupant D is restrained and protected from the side-on collision by the lateral deployment section 38 on the vehicle width direction central side.

In this manner, the occupant protection device 10 enables movement of the head H toward the collision side to be limited. Moreover, since the lateral deployment section 38 includes the lateral inflating portion 44, deformation of the lateral inflating portion 44 functions to absorb energy during the restraint process of the head H. For example, the peak load input to the head H can be kept small even when the head H moves as far as a region where it might impinge on the seatback of the adjacent seat or the occupant in the adjacent seat.

Moreover, when the head H of the seated occupant D swings back after having been protected by the lateral deployment section 38 on the vehicle width direction central side, movement of the seated occupant D toward the non-collision side is limited by the lateral deployment section 38 on the vehicle width direction outer side, and by the side airbag 22B. Thus, for example, the head H of the seated occupant D is suppressed from impinging on the side window glass.

Full Overlap or Offset Frontal Collisions

When the ECU 60 has detected or predicted a full overlap frontal collision based on information from the collision sensor 62, the ECU 60 actuates the inflator 32 and the retractor 26. The belt 28 of the seatbelt device 24 is thereby forcibly taken up by the retractor 26, and the multidirectional airbag 30 of the multidirectional airbag device 20 is inflated and deployed so as to surround the head H of the seated occupant D.

In a full overlap frontal collision, the seated occupant D moves straight forward under inertia. Note that the seated occupant D wearing the belt 28 of the seatbelt device 24 moves forward with the upper body of the seated occupant D tilted forward about the waist P. The head H of the seated occupant D contacts the front deployment section 36 of the multidirectional airbag 30 while being restrained by (receiving resistance against movement forward from) the shoulder belt 28S, and movement of the head H forward is limited by the front deployment section 36. Moreover, the second inflating portion 42B of the front inflating portion 42 contacts the chest B and the shoulders S of the seated occupant D from the forward direction, such that movement of the upper body (head H) of the seated occupant D forward is limited by the second inflating portion 42B of the front inflating portion 42.

In this manner, the head H and upper body of the seated occupant D are restrained and protected against the full overlap frontal collision by the front deployment section 36. Namely, movement of the head H and the upper body of the seated occupant D forward can be limited. Moreover, since the front deployment section 36 includes the front inflating portion 42, deformation of the front inflating portion 42 functions to absorb energy during the restraint process of the head H, the chest B, and the shoulders S. For example, the peak load input to the head H can thereby be kept small, even when the head H moves as far as a region where it might impinge on vehicle interior configuration components (such as a steering wheel or instrument panel).

Explanation has been given regarding a case of a full overlap frontal collision; however, in a case of an offset frontal collision in which, for example, a vehicle width direction overlap amount with another vehicle is approximately 50%, substantially the same operation applies as in the full overlap frontal collision described above.

Oblique Collisions and Small Overlap Collisions

When the ECU 60 has detected or predicted an oblique collision based on information from the collision sensor 62, the ECU 60 actuates the inflators 22A, 32, and the retractor 26. The belt 28 of the seatbelt device 24 is thereby forcibly taken up by the retractor 26, and the multidirectional airbag 30 of the multidirectional airbag device 20 is inflated and deployed so as to surround the head H of the seated occupant D. Moreover, the side airbag 22B of the side airbag device 22 is inflated and deployed at the vehicle width direction outer side of the seated occupant D. Further explanation follows regarding the case of an oblique collision; however, a protection mode of the seated occupant D by the occupant protection device 10 in a small overlap collision is substantially the same as a protection mode of the seated occupant D by the occupant protection device 10 in an oblique collision.

Nearside Oblique Collisions

In an oblique collision on the vehicle width direction side installed with the vehicle seat 12, as illustrated by the arrow X in FIG. 3A, the seated occupant D moves toward the vehicle width direction outer side, this being the side of the collision to the vehicle body in the vehicle width direction, while also moving forward. Again, in this case, the seated occupant D wearing the three-point type seatbelt device 24 moves forward with the seated occupant D tilted forward about the waist P.

In this case, movement of the seated occupant D toward an oblique front collision side (front pillar side) is limited by the side airbag 22B, as well as by the front deployment section 36 and the lateral deployment section 38 on the vehicle width direction outer side configuring the multidirectional airbag 30. Namely, the upper body and head H of the seated occupant D are restrained and protected from the oblique collision by the side airbag 22B, as well as the front deployment section 36 and the lateral deployment section 38 on the vehicle width direction outer side configuring the multidirectional airbag 30.

In this manner, the occupant protection device 10 enables movement of the head H toward the oblique front collision side to be limited. Moreover, the front deployment section 36 and the lateral deployment section 38 on the vehicle width direction outer side include the first inflating portion 42A and the lateral inflating portion 44 disposed about the seam portion 47. Accordingly, deformation of at least one of the first inflating portion 42A or the lateral inflating portion 44 functions to absorb energy during the restraint process of the head H and the like. For example, the peak load input to the head H can thereby be kept small, even when the head H moves as far as the front pillar.

Far-Side Oblique Collisions

In an oblique collision on the vehicle width direction opposite side to the side installed with the vehicle seat 12, as illustrated by the arrow Y in FIG. 3A, the seated occupant D moves toward the vehicle width direction central side, this being the side of the collision to the vehicle body in the vehicle width direction, while also moving forward. Again, in this case, the seated occupant D wearing the three-point type seatbelt device 24 moves forward with the seated occupant D tilted forward about the waist P.

In this case, movement of the seated occupant D toward the oblique front collision side (center cluster side) is limited by the front deployment section 36 and the lateral deployment section 38 on the vehicle width direction central side configuring the multidirectional airbag 30. Namely, the head H of the seated occupant D is restrained and protected against the oblique collision by the front deployment section 36 and the lateral deployment section 38 on the vehicle width direction central side.

In this manner, the occupant protection device 10 enables movement of the head H toward the oblique front collision side to be limited. Moreover, the front deployment section 36 and the lateral deployment section 38 on the vehicle width direction central side include the first inflating portion 42A and the lateral inflating portion 44 disposed about the seam portion 47. Accordingly, deformation of at least one of the first inflating portion 42A or the lateral inflating portion 44 functions to absorb energy during the restraint process of the head H and the like. For example, the peak load input to the head H can thereby be kept small, even when the head H moves as far as vehicle interior configuration components such as the instrument panel or the center cluster.

Summary of Protection Operation in Collisions

As explained above, in the occupant protection device 10 according to the first exemplary embodiment, the multidirectional airbag 30 housed in the headrest 18 can be inflated and deployed to effectively protect the seated occupant D in side-on collisions, frontal collisions, and oblique collisions (collisions from plural directions). The multidirectional airbag 30 is configured as an integral bag body that deploys such that the front deployment section 36 and the lateral deployment sections 38 surround the head H together with the upper deployment section 48 and the rear deployment section 52. Accordingly, in the multidirectional airbag 30, the respective deployment sections are firmly linked to one another, and load (reaction force) is supported by the vehicle seat 12 during restraint of the head H, chest B, and shoulders S. Accordingly, the multidirectional airbag 30 enables the occupant to be restrained with a greater restraining force than in configurations in which plural airbags (inflating portions) join together during restraint of the occupant.

In the occupant protection device 10, the multidirectional airbag 30 is housed inside the headrest 18 (the module case 34 provided to the rearward direction of the headrest body 19). Accordingly, the occupant protection device 10 has a more pleasing appearance prior to actuation, while securing equivalent or superior occupant protection performance to that of, for example, a configuration in which gas supply pipes disposed so as to surround the head of the occupant from above are always projecting out inside the vehicle cabin. Moreover, the occupant protection device 10 (in particular the multidirectional airbag device 20) does not hinder front-rear positional adjustment, height adjustment, reclining operation, or the like of the vehicle seat 12.

In the occupant protection device 10, as viewed from the side, when in non-restraining inflated and deployed states, the multidirectional airbag 30 and the side airbag 22B are not superimposed on each other. Accordingly, in collision modes in which both the multidirectional airbag 30 and the side airbag 22B are inflated and deployed, the multidirectional airbag 30 and the side airbag 22B inflate and deploy appropriately, without impinging on the inflation and deployment of each other. This thereby enables the head H of the seated occupant D to be restrained by the multidirectional airbag 30, and enables the seated occupant D to be restrained by the side airbag 22B from the side over a range spanning from the shoulders S to the waist P.

As described above, in the occupant protection device 10, the multidirectional airbag device 20, the side airbag device 22, and the seatbelt device 24 provided to the vehicle seat 12 are capable of protecting the seated occupant D against various collision modes. Accordingly, the installation of other airbag devices may be omitted in an automobile applied with the occupant protection device 10. For example, if the vehicle seat 12 applied with the occupant protection device 10 is a driving seat, the installation of a driving seat airbag device provided in the steering wheel, and the installation of a curtain airbag device provided in a roof-side section may be omitted. Moreover, for example, if the vehicle seat 12 applied with the occupant protection device 10 is a front passenger seat, the installation of a front passenger seat airbag device provided in an instrument panel, and the installation of a curtain airbag device provided in a roof-side section may be omitted. Moreover, for example, if the vehicle seat 12 applied with the occupant protection device 10 is a seat in a second row onward, the installation of a curtain airbag device provided in a roof-side section may be omitted.

Other Operation and Advantageous Effects

Securing Inflation and Deployment Performance with the Multidirectional Airbag Itself, and Improving Restraint Performance Through Appropriate Inflation and Deployment In the multidirectional airbag device 20 configuring the occupant protection device 10, the lower ends 44L of the lateral inflating portions 44 configuring the lateral deployment sections 38 of the multidirectional airbag 30 contact the shoulders S of the seated occupant D from above, thereby positioning the multidirectional airbag 30 in the vertical direction with respect to the seated occupant D. For example, this thereby enables the multidirectional airbag 30 to be inflated and deployed at an appropriate position in the vertical direction, irrespective of individual differences in the physical frame or seated posture, within an appropriate range, of the seated occupant D. The restraint (movement limiting) performance of the occupant by the multidirectional airbag 30 is thereby improved.

Moreover, in the multidirectional airbag device 20, the multidirectional airbag 30 is configured by an integral bag body that surrounds the head H of the seated occupant D, and includes the lateral inflating portions 44 partitioned by the seam portions 46, and the front inflating portion 42 partitioned from the lateral inflating portions 44 by the seam portions 47. During the inflation and deployment process of the multidirectional airbag 30, the front inflating portion 42 (the first inflating portion 42A) is inflated and deployed first, after which the lateral inflating portions 44 are inflated and deployed.

Accordingly in the multidirectional airbag 30, first, the front inflating portion 42 inflates and deploys so as to approach the head H from the forward direction, after which the left and right lateral inflating portions 44 inflate and deploy so as to approach the head H from both the left and right sides. In other words, in the multidirectional airbag 30, the front inflating portion 42 and the lateral inflating portions 44 approach the head in stages (draw closer from an open state in stages) due to the inflation and deployment of the respective inflating portions 42, 44 during the inflation and deployment process. The multidirectional airbag 30 is thereby suppressed from impinging on the head H during the deployment process, and approaches the head H after inflation and deployment has completed, thereby improving restraint (movement limiting) performance of the occupant by the multidirectional airbag 30.

Moreover, in the multidirectional airbag 30, the front inflating portion 42 is supplied with gas through the upper duct portions 50D that inflate and deploy above the head H of the seated occupant D, and the lateral inflating portions 44 are supplied with gas through the front inflating portion 42. Accordingly, a configuration in which the front inflating portion 42 inflates and deploys earlier than the lateral inflating portions 44 can be achieved by a simple configuration. Moreover, the upper duct portions 50D inflate and deploy above the head H earlier than inflation and deployment of the front inflating portion 42 and the lateral inflating portions 44, such that accompanying inflation and deployment of the upper duct portions 50D, the front inflating portion 42 passes above the head H prior to being inflated and deployed. In this manner, the multidirectional airbag 30 is inflated and deployed toward seat forward direction accompanying the flow of gas through the upper duct portions 50D, facilitating inflation and deployment of the multidirectional airbag 30 in a manner that passes over the head H of the seated occupant D.

Moreover, the multidirectional airbag 30 is housed inside the module case 34 in a state rolled up outward. A portion of the multidirectional airbag 30 that unfolds during the inflation and deployment process is thereby positioned above the upper duct portions 50D. This facilitates deployment of the multidirectional airbag 30 in a mode passing over the head H of the seated occupant D while deploying forward accompanying the flow of gas into the upper duct portions 50D in comparison to configurations in which the portion that unfolds is at a position below the upper duct portions 50D, namely on the side of the head H of the seated occupant D.

Securing Inflation and Deployment Performance of the Multidirectional Airbag with the Deployment Guide Cloth The multidirectional airbag device 20 configuring the occupant protection device 10 also includes the deployment guide cloth 58 with the face at the side contacting the multidirectional airbag 30 configured as a low friction face. The deployment guide cloth 58 is deployed along the vehicle cabin ceiling of the automobile in advance of the multidirectional airbag 30 accompanying inflation and deployment of the multidirectional airbag 30. The deployment guide cloth 58 has lower friction with respect to the multidirectional airbag 30 than the vehicle cabin ceiling material, thereby enabling the multidirectional airbag 30 to be inflated and deployed more smoothly than in configurations in which the deployment guide cloth 58 is not included.

Thus, the multidirectional airbag 30 is suppressed by the deployment guide cloth 58 from catching on the vehicle cabin ceiling, a member provided to the ceiling, or the like, in the inflation and deployment process. In other words, the multidirectional airbag 30 can be smoothly inflated and deployed, while utilizing the vehicle cabin ceiling as a guide (a limiter that limits upward movement) so as to inflate and deploy the multidirectional airbag 30 forward.

Securing Inflation and Deployment Performance of the Multidirectional Airbag with the Module Case In the multidirectional airbag device 20 configuring the occupant protection device 10, the module case 34 juts out upward of and to both seat width direction sides of the headrest body 19. The multidirectional airbag 30 can accordingly be deployed forward from the portions of the module case 34 that jut out with respect to the headrest body 19 as viewed from the front (through a gap portion between the module case 34 and the headrest body 19). This thereby enables inflation and deployment of the multidirectional airbag 30 to be completed in a shorter time than in a configuration provided with a multidirectional airbag that passes around from a back face side of the headrest body 19 only and deploys forward.

Moreover, the module case 34 houses the multidirectional airbag 30 to the rearward direction of the headrest body 19, between the headrest body 19 and the module case 34. The main wall 34M of the module case 34 supports the multidirectional airbag 30 from the rearward direction during the inflation and deployment process. Reaction force is thereby supported from the rearward direction by the main wall 34M accompanying inflation and deployment of the multidirectional airbag 30, such that the multidirectional airbag 30 is inflated and deployed forward without heading rearward. This thereby enables a more appropriate inflation and deployment mode (position, shape) of the multidirectional airbag 30 than in configurations in which a main wall of the module case 34 does not include (the functionality of) a support wall.

Moreover, the main wall 34M of the module case 34 configures a curved shape that is convex upward and rearward as viewed from the side, such that the upper end of the main wall 34M is positioned further forward than the lower end. Accordingly, while the multidirectional airbag 30, in a folded state at the rear of the headrest body 19, heads upward inside the module case 34 during an initial stage of inflation and deployment, the multidirectional airbag 30 is guided upward and forward by the main wall 34M during deployment from the module case 34. Namely, during the inflation and deployment process, the multidirectional airbag 30 is guided upward and toward the front by the main wall 34M of the module case 34 so as to be deployed forward while passing over the head H of the seated occupant D. This thereby enables a more appropriate inflation and deployment mode (path) of the multidirectional airbag 30 than in configurations in which the main wall 34M does not include (the functionality of) a guide wall.

Other Advantageous Effects Due to Module Case, Etc.

In the multidirectional airbag device 20 configuring the occupant protection device 10, the module case 34 that houses the multidirectional airbag 30 and the inflator 32 is disposed to the rearward direction of the headrest body 19. Accordingly, constraints resulting from the structure of the vehicle seat 12 are less likely to be encountered than, for example, in a configuration in which the multidirectional airbag 30 and the inflator 32 are housed inside the seatback 16. In other words, the multidirectional airbag device 20 can be provided to the vehicle seat 12 without heavy modification to the structure of the vehicle seat 12.

When in the folded state, the multidirectional airbag 30 is disposed to the rearward direction of the upper portions 18SU and the intermediate portions 18SC of the headrest stays 18S. This enables the multidirectional airbag 30 to be disposed in a larger space to the rearward direction of the headrest stays 18S formed in crank shapes than, for example, in configurations in which the multidirectional airbag 30 is disposed to the rearward direction of headrest stays 18S formed in straight shapes along the vertical direction. This enables the multidirectional airbag 30 to be housed inside the headrest 18, while achieving a compact configuration for the overall headrest 18, including the module case 34. Moreover, since the multidirectional airbag 30 is disposed in a folded-up state close to the head H of the seated occupant D, the multidirectional airbag 30 can be caused to inflate and deploy in a manner surrounding the head H of the seated occupant D within a short time.

Advantageous Effects of the See-Through Structure of the Multidirectional Airbag In the multidirectional airbag device 20 configuring the occupant protection device 10, the front deployment section 36 of the multidirectional airbag 30 is provided with the mesh portion 40 serving as a see-through structure in front of the head H of the seated occupant D. The seated occupant D is accordingly able to see an area (in the vehicle cabin and at the outside of the vehicle) at the front side of the front deployment section 36 through the mesh portion 40 in an inflated and deployed state of the multidirectional airbag 30 (both during protection and after protection by the multidirectional airbag 30). Namely, a field of vision in front of the seated occupant D can be secured.

Other Exemplary Embodiments

Next, explanation follows regarding other exemplary embodiments. Note that configuration or operation basically the same as in the first exemplary embodiment or foregoing exemplary embodiments is appended with the same reference numerals as in the first exemplary embodiment or foregoing exemplary embodiments, and explanation and illustration thereof may be omitted.

Second Exemplary Embodiment

Figure 7A:
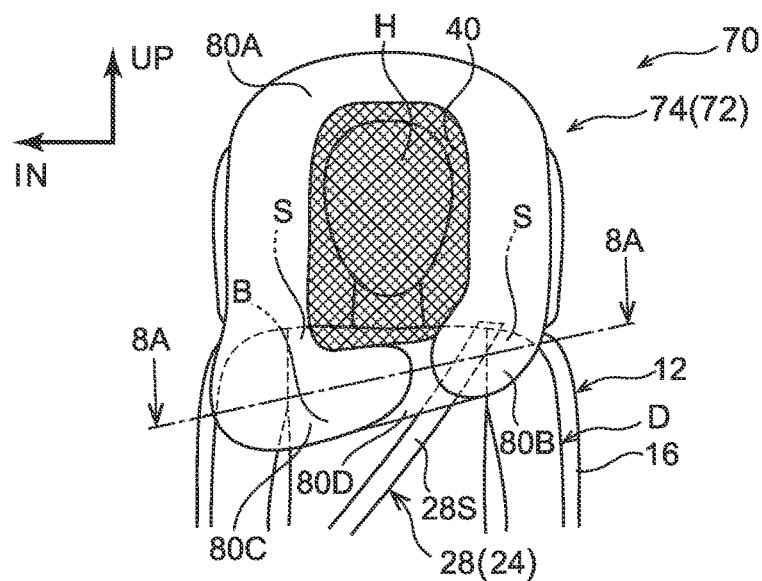
FIG. 7A is a front view illustrating relevant portions of an occupant protection device according to a second exemplary embodiment.

Explanation follows regarding an occupant protection device 70 according to a second exemplary embodiment, with reference to FIG. 7A to FIG. 8B. FIG. 7A is a front view illustrating relevant portions of the occupant protection device 70 according to the second exemplary embodiment. As illustrated in FIG. 7A, the occupant protection device 70 is configured including a multidirectional airbag device 72 instead of the multidirectional airbag device 20 of the first exemplary embodiment. The multidirectional airbag device 72 differs from the multidirectional airbag device 20 in the point that a multidirectional airbag 74 is provided instead of the multidirectional airbag 30. The multidirectional airbag device 72 further differs from the multidirectional airbag device 20 in the point that a coupling strap 76 is provided to serve as a coupling cloth.

The multidirectional airbag 74 is configured including a front deployment section 78 instead of the front deployment section 36 of the first exemplary embodiment. The front deployment section 78 is configured including the mesh portion 40 and a front inflating portion 80. Moreover, the front inflating portion 80 is configured including a first inflating portion 80A that inflates and deploys along an upper edge and along both left and right side edges of the mesh portion 40, and left and right second inflating portions 80B, 80C that are both continuous to and below the first inflating portion 80A. In the following explanation, the left and right second inflating portions 80B, 80C both configure inflating and deploying portions that are independent of each other about a non-inflating portion 80D that is interposed therebetween. Moreover, in the following explanation, the second inflating portion 80B on the vehicle width direction outer side is referred to as the first shoulder restraint portion 80B, and the second inflating portion 80C on a vehicle width direction central side is referred to as the second shoulder restraint portion 80C.

Figure 8A:
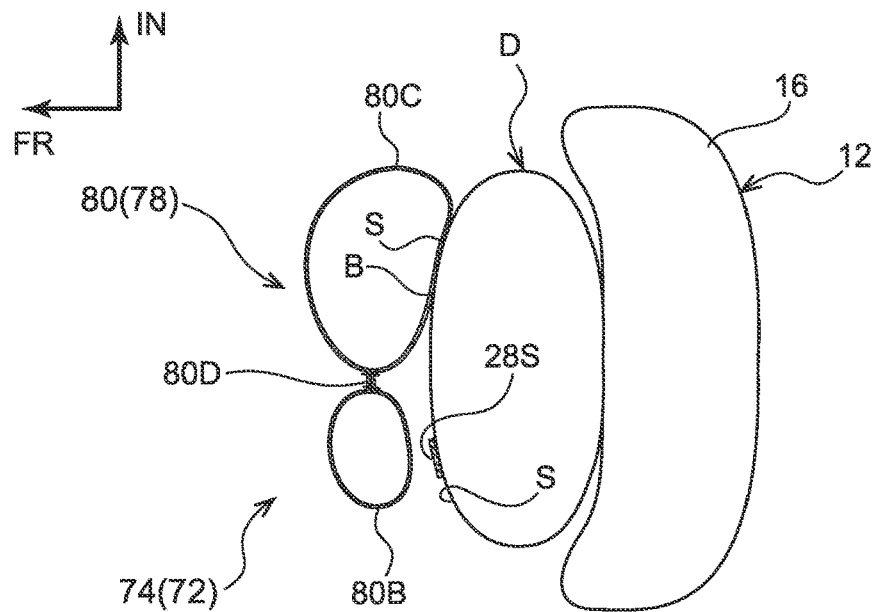
FIG. 8A is a cross-section taken along line 8A-8A in FIG. 7A, illustrating an inflated and deployed state of a multidirectional airbag configuring an occupant protection device according to the second exemplary embodiment.

Note that as illustrated in FIG. 8A, the second shoulder restraint portion 80C is configured so as to inflate and deploy so as to approach the chest B of the seated occupant D more closely than the first shoulder restraint portion 80B. In other words, configuration is made such that in a non-restraining inflated and deployed state, the second shoulder restraint portion 80C is positioned closer to the seatback 16 in the front-rear direction than the first shoulder restraint portion 80B. More specifically, the second shoulder restraint portion 80C is configured with a larger capacity than the first shoulder restraint portion 80B, and the front-rear direction thickness of the second shoulder restraint portion 80C when inflated is configured thicker than the front-rear direction thickness of the first shoulder restraint portion 80B when inflated. Accordingly, the shoulder S on the side of the seated occupant D that is not restrained by the shoulder belt 28S of the seatbelt device 24 is restrained by the second shoulder restraint portion 80C, and the shoulder S on the shoulder belt 28S side of the seated occupant D is restrained by the first shoulder restraint portion 80B. Moreover, in the present exemplary embodiment, the second shoulder restraint portion 80C is configured with a broader contact surface area with the seated occupant D than the first shoulder restraint portion 80B during restraint of the seated occupant D. Specifically, the first shoulder restraint portion 80B primarily restrains the shoulder S of the seated occupant D from the forward direction, whereas the second shoulder restraint portion 80C restrains both the shoulder S and the chest B of the seated occupant D from the forward direction.

Figure 7B:
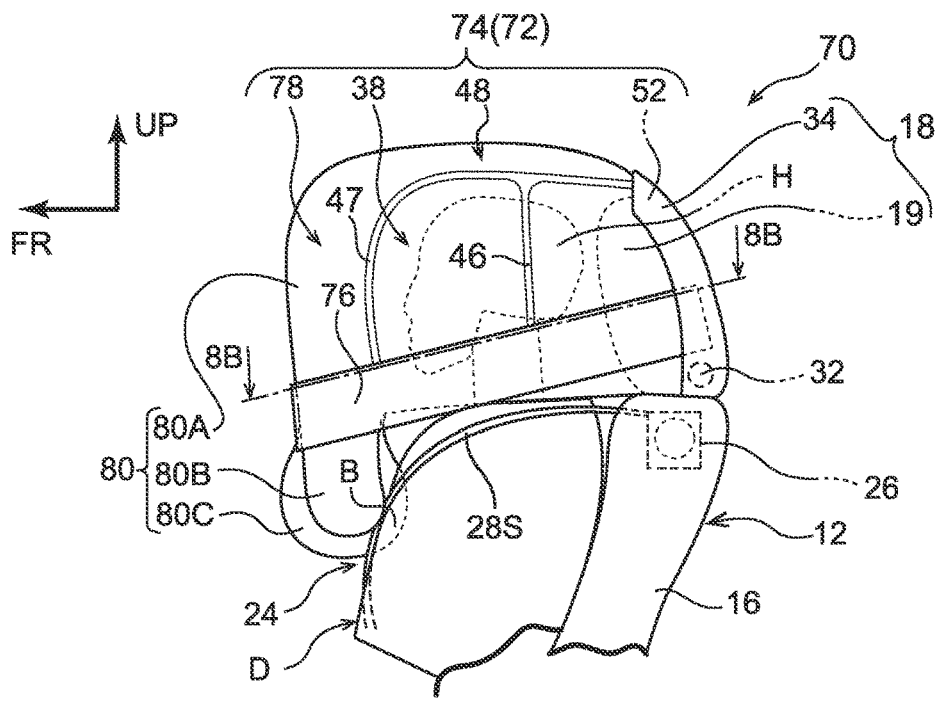
FIG. 7B is a side view illustrating relevant portions of an occupant protection device according to the second exemplary embodiment.
Figure 8B:
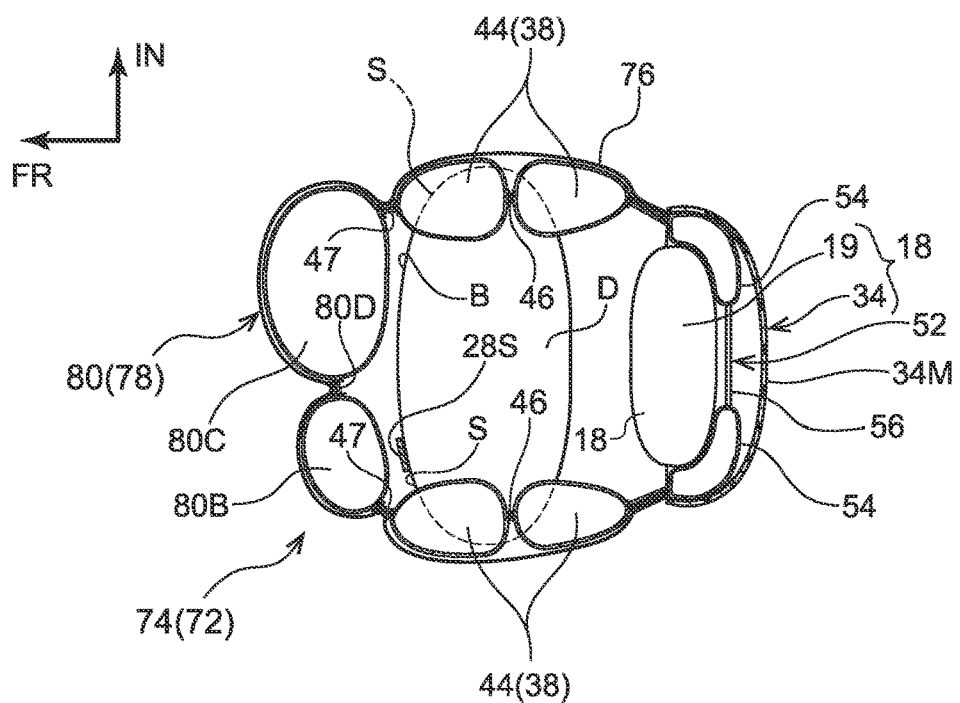
FIG. 8B is a cross-section taken along line 8B-8B in FIG. 7B, illustrating relevant portions of an occupant protection device according to the second exemplary embodiment.

FIG. 7B is a side view illustrating other relevant portions of the occupant protection device 70, and FIG. 8B is a cross-section taken along line 8B-8B in FIG. 7B. Note that the coupling strap 76 is omitted from illustration in FIG. 7A. As illustrated in FIG. 7B and FIG. 8B, the coupling strap 76 is a cloth member that deploys so as to surround the multidirectional airbag 74 in plan view, and is configured from a high-strength fabric that does not readily stretch under tension. Specifically, for example, the coupling strap 76 is configured from a woven material, similarly to a base cloth of the multidirectional airbag 74, and has a stretch ratio equivalent to or less than that of the base cloth. The coupling strap 76 also has a strength equivalent to or greater than that of the base cloth of the multidirectional airbag 74. The coupling strap 76 is folded up together with the multidirectional airbag 74, and is deployed in a state of coupling the headrest 18 to the first and second shoulder restraint portions 80B, 80C that serve as an upper body restraint portion.

In the present exemplary embodiment, the coupling strap 76 reaches from one seat width direction side of the rear deployment section 52 to the other seat width direction side of the rear deployment section 52, via the lateral deployment section 38 on the one side, the front deployment section 78, and the lateral deployment section 38 on the other side, and is joined to the multidirectional airbag 74 at plural locations along the peripheral direction. More specifically, the coupling strap 76 is joined to both seat width direction ends of the rear deployment section 52, the left and right seam portions 47, and the non-inflating portion 80D respectively, using a joining method such as stitching or bonding.

As illustrated in FIG. 7B, the coupling strap 76 deploys so as to pass a lower portion of the rear deployment section 52 and a lower portion of the front deployment section 78 in side view. More specifically, in side view, in a deployed state, the coupling strap 76 reaches from the lower portion of the rear deployment section 52 to a portion between the first inflating portion 80A and the first and second shoulder restraint portions 80B, 80C of the front inflating portion 80, and in side view, the coupling strap 76 is configured so as to deploy in an inclined orientation positioned further downward on progression forward. In the inflated and deployed state, the first and second shoulder restraint portions 80B, 80C of the multidirectional airbag 74 are coupled to the headrest 18 through the rear deployment section 52 by the coupling strap 76.

The coupling strap 76 is configured to limit movement of the first and second shoulder restraint portions 80B, 80C forward during restraint of the seated occupant D. Accordingly, the first and second shoulder restraint portions 80B, 80C correspond to an upper body restraint portion of the present disclosure. Note that it is sufficient that the coupling strap 76 exhibit the above coupling function (limit movement of the first and second shoulder restraint portions 80B, 80C forward), and the coupling strap 76 may be joined to the multidirectional airbag 74 continuously or intermittently along its overall length, or may be joined to the multidirectional airbag 74 at the rear deployment section 52 alone. Moreover, the coupling strap 76 may be formed with an overall looped shape.

Operation of the Second Exemplary Embodiment

Explanation follows regarding operation of the occupant protection device 70 according to the second exemplary embodiment, in particular with regard to portions exhibiting operation that differs from the operation of the occupant protection device 10 according to the first exemplary embodiment described above.

Shoulder Restraint Portion Operation

In the multidirectional airbag device 72 configuring the occupant protection device 70 according to the second exemplary embodiment, the front inflating portion 80 of the multidirectional airbag 74 includes the first and second shoulder restraint portions 80B, 80C on the left and right. The first and second shoulder restraint portions 80B, 80C have different capacities to each other. Moreover, the second shoulder restraint portion 80C restrains the shoulder S on the side of the seated occupant D that is not restrained by the shoulder belt 28S with a greater restraining force (more strongly) than that of the first shoulder restraint portion 80B that restrains the shoulder S on the side of the seated occupant D restrained by the shoulder belt 28S.

Accordingly, in an oblique collision or a small overlap collision to the seat width direction side that is not restrained by the shoulder belt 28S, movement of the seated occupant D toward the oblique front collision side is limited more effectively than in a configuration in which the second inflating portions exert the same restraint force on both shoulders. Namely, the seated occupant D is effectively restrained in afar-side oblique collision or small overlap collision. In particular, the second shoulder restraint portion 80C restrains the shoulders S and the chest B of the seated occupant D from the forward direction, in other words, restraining the seated occupant D over a broader range than the first shoulder restraint portion 80B. Accordingly, movement of the seated occupant D toward the oblique front collision side is limited even more effectively in the event of an oblique collision or a small overlap collision to the seat width direction side that is not restrained by the shoulder belt 28S.

Coupling Strap Operation

The coupling strap 76 joined to the multidirectional airbag 74 is deployed accompanying inflation and deployment of the multidirectional airbag 74. In a deployed state, the coupling strap 76 surrounds the multidirectional airbag 74 from an outer peripheral side in plan view, as illustrated in FIG. 8B, and reaches from the lower portion of the rear deployment section 52 to the lower portion of the front deployment section 78 in side view, as illustrated in FIG. 7B. Since the coupling strap 76 is configured from a high strength cloth member that does not stretch readily, for example, movement of the front deployment section 78, namely of the multidirectional airbag 74, forward is limited during restraint of the head H, the chest B, and the shoulders S of the seated occupant D by the front deployment section 78. Namely, the restraint performance of the head H, the chest B, and the shoulders S by the front inflating portion 80 in a frontal collision is improved.

Moreover, this is not limited to full overlap frontal collisions and offset collisions, and the configuration provided with the coupling strap 76 also improves restraint performance of the head H, the chest B, and the shoulders S by the front inflating portion 80 in oblique collisions and small overlap collisions.

Third Exemplary Embodiment

Explanation follows regarding an occupant protection device 90 according to a third exemplary embodiment, with reference to FIG. 9A to FIG. 11B. FIG. 9A is a back face view illustrating a schematic overall configuration of the occupant protection device 90 according to the third exemplary embodiment, and FIG. 9B is a side view schematically illustrating relevant portions of the occupant protection device 90. As illustrated in FIG. 9A to FIG. 11B, the occupant protection device 90 is applied to a vehicle seat 92 configured differently to the vehicle seat 12 of the first and second exemplary embodiments. First, explanation follows regarding the vehicle seat 92, followed by explanation regarding the occupant protection device 90. Note that in FIG. 9A to FIG. 11B, an outer profile of the vehicle seat 92 is illustrated by hypothetical lines, and internal structures of the vehicle seat 92 are illustrated by solid lines.

Vehicle Seat

As illustrated in FIG. 9A, in the vehicle seat 92, a seatback 94 with an integral headrest is connected to a seat cushion 14 (not illustrated in the drawings). In external view of the seatback 94, a headrest section 94H is connected so as to be continuous to an upper portion of a backrest section 94B such that there is no clear boundary between the backrest section 94B and the headrest section 94H.

In the seatback 94, a spring such as an S-spring, a cushion member, and a cover, not illustrated in the drawings, are assembled to a seatback frame 96. The seatback frame 96 is configured including a pair of left and right side frames 96S. The respective side frames 96S run parallel to each other in the vertical direction, and reach from a portion coupled to the seat cushion 14 to the vicinity of an upper end of the backrest section 94B. The seatback frame 96 is configured including a pair of left and right pipe frames 96P, lower ends of which are connected to upper ends of the side frames 96S.

Lower portions of the pipe frames 96P are curved toward the seat width direction central side, and upper portions of the pipe frames 96P extend in the vertical direction. Accordingly, a spacing in the seat width direction between the upper portions of the pair of pipe frames 96P is narrower than a spacing between lower end portions of the pipe frames 96P (between the pair of side frames 96S). Moreover, the upper portions of the pair of pipe frames 96P are coupled together by a coupling plate 96C configuring the seatback frame 96. Although not illustrated in the drawings, the coupling plate 96C supports a cushion member of the headrest section 94H disposed at the front side of the coupling plate 96C.

Occupant Protection Device

Figure 11A:
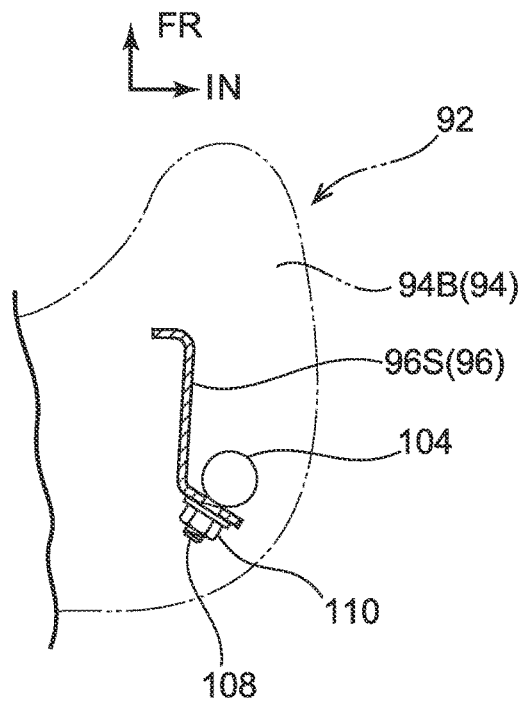
FIG. 11A is an enlarged plan view illustrating a support state of an inflator of a multidirectional airbag configuring an occupant protection device according to the third exemplary embodiment on a side frame, as viewed when a cushion member and covering material of a seatback have been removed.
Figure 11B:
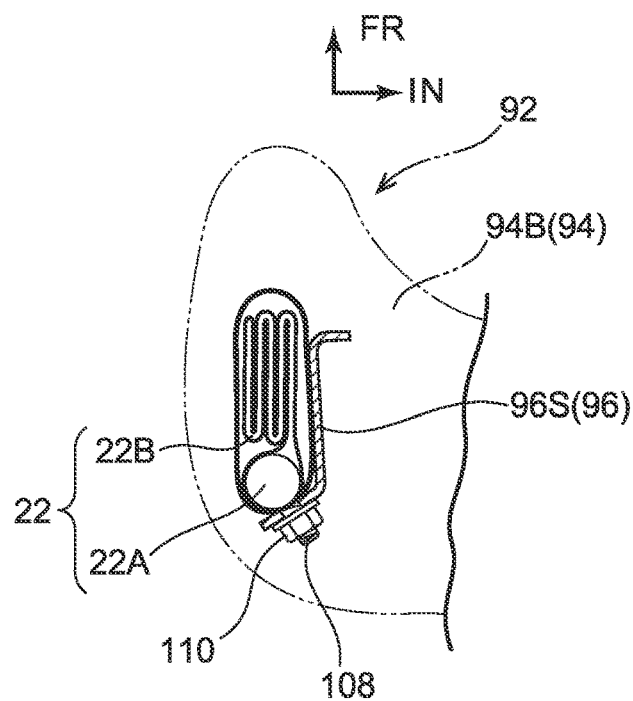
FIG. 11B is an enlarged plan view illustrating a support state of a side airbag device configuring an occupant protection device according to the third exemplary embodiment on a side frame, as viewed when a cushion member and covering material of a seatback have been removed.

The side airbag device 22 is housed in a side portion at the vehicle width direction outer side of the seatback 94, in a state supported on the side frame 96S that is positioned on the seat width direction outer side out of the pair of side frames 96S. Specifically, as illustrated in FIG. 11B, a nut 110 is screwed onto a stud bolt 108 that projects out from the inflator 22A and passes through the side frame 96S, in a state in which the inflator 22A is installed inside the side airbag 22B. The inflator 22A, namely the side airbag device 22, is thus supported by the side frame 96S. In the present exemplary embodiment, the side airbag device 22 is supported at the seat width direction outer side of the side frame 96S. The inflator 22A corresponds to a first inflator of the present disclosure.

The occupant protection device 90 is configured including a multidirectional airbag device 100 instead of the multidirectional airbag device 20 of the first exemplary embodiment. The multidirectional airbag device 100 is configured including the multidirectional airbag 30, a module case 102, an inflator 104 serving as a second inflator, and a cloth tube 106 serving as a communication member.

Figure 10A:
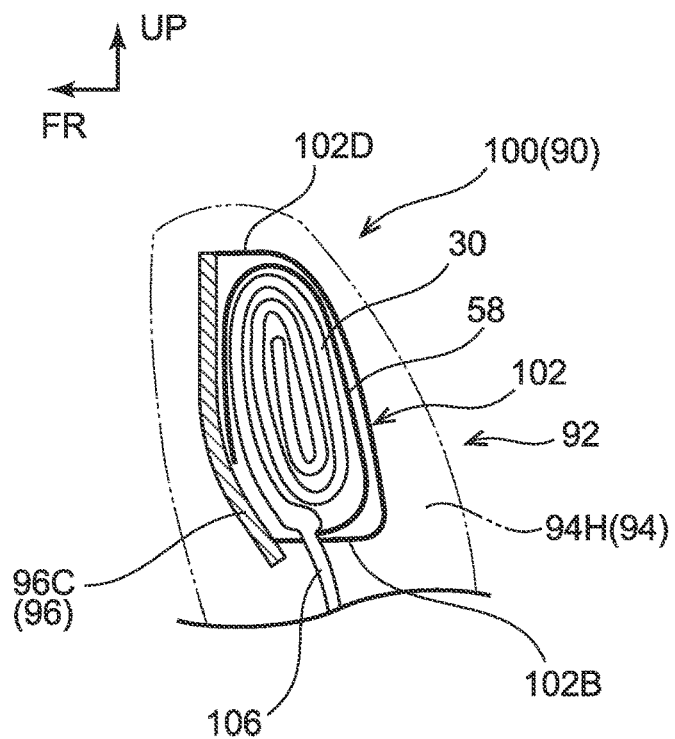
FIG. 10A is an enlarged side view and partial cross-section illustrating a housed state of a multidirectional airbag configuring an occupant protection device according to the third exemplary embodiment, with a cushion member and covering material of a seatback removed.
Figure 10B:
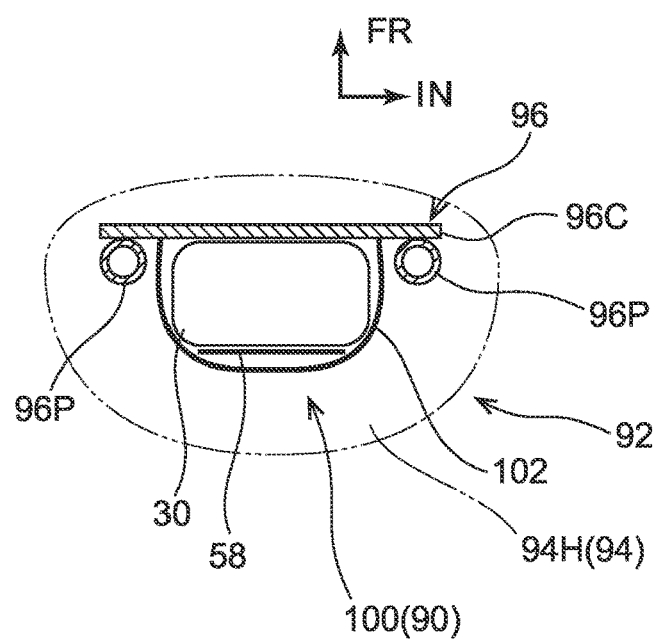
FIG. 10B is an enlarged top-down cross-section illustrating a housed state of a multidirectional airbag configuring an occupant protection device according to the third exemplary embodiment, as viewed when a cushion member and covering material of a seatback have been removed.

As illustrated in FIG. 10A and FIG. 10B, the module case 102 is fixed to a back face side of the coupling plate 96C, and forms a housing space for the multidirectional airbag 30. A portion on the gas entry portion 54G side of the multidirectional airbag 30, this being a base end, is connected (fixed) to a lower wall 102B of the module case 102 together with a base end of the deployment guide cloth 58.

An upper wall of the module case 102 configures an airbag door 102D that, under the inflation pressure of the multidirectional airbag 30, deforms so as to open up an upper portion of the module case 102 while pushing the cushion member out of the way at an apex of the headrest section 94H (this process is not illustrated in the drawings). The multidirectional airbag 30 of the present exemplary embodiment is housed in the upper portion of the seatback 94 in this manner. More specifically, the multidirectional airbag 30 is basically housed in the headrest section 94H of the seatback 94 in a folded state.

Note that as illustrated in FIG. 9A and FIG. 9B, a covering member configuring the headrest section 94H of the seatback 94 is formed with a burst line BL running along an outer edge of the headrest section 94H. Under the inflation pressure of the multidirectional airbag 30, the seatback 94 splits open along the burst line BL, thereby permitting inflation and deployment of the multidirectional airbag 30 out from the seatback 94.

The inflator 104 is housed in a side portion at a vehicle width direction central side of the seatback 94, in a state supported by the side frame 96S that, out of the pair of side frames 96S, is positioned on the vehicle width direction central side. Specifically, as illustrated in FIG. 11A, a nut 110 is screwed onto a stud bolt 108 that projects out from the inflator 104 and passes through the side frame 96S. The inflator 104 is thus supported by the side frame 96S. In the present exemplary embodiment, the inflator 104 is supported on the seat width direction outer side of the side frame 96S.

In this manner, the multidirectional airbag 30 and the inflator 104 that are housed in and supported by different portions of the seatback 94 are connected together in a state in communication with each other through the cloth tube 106. Although not illustrated in the drawings, one end of the cloth tube 106 covers the gas outlet of the inflator 104, and the other end of the cloth tube 106 is connected to the gas entry portion 54G of the multidirectional airbag 30 by stitching or the like. The cloth tube 106 is formed in a tube shape, for example from a woven material similar to that of the base cloth of the multidirectional airbag, and an inner face of the cloth tube 106 is sealed with a silicone coating or the like.

The multidirectional airbag device 100 is thus configured such that on actuation of the inflator 104, gas generated by the inflator 104 flows through the cloth tube 106 and is supplied into the multidirectional airbag 30. Note that the inflator 104 is electrically connected to the ECU 60, and actuation of the inflator 104 is controlled by the ECU 60.

Operation of the Third Exemplary Embodiment

Explanation follows regarding operation of the occupant protection device 90 according to the third exemplary embodiment, in particular with regard to operation that differs from the operation of the occupant protection device 10 according to the first exemplary embodiment described above.

In the occupant protection device 90, the inflator 22A (side airbag device 22) is supported by the side frame 96S on the vehicle width direction outer side of the seatback 94, and the inflator 104 is supported on the side frame 96S on the vehicle width direction central side. Accordingly, the inflator 104 configuring the multidirectional airbag device 100 can be mounted in a limited mounting space within the seatback 94, and can be supported with sufficient strength using a simple structure.

To expand on this point, the seatback 94 with an integral headrest does not have a top frame extending in the vehicle width direction so as to span between upper ends of the left and right side frames. Accordingly, the seatback 94 cannot be applied with a configuration in which the inflator 32 is supported on a top frame, as in the first exemplary embodiment. In this seatback 94, adopting a configuration in which the inflator 104 is supported on the side frame 96S on the vehicle width direction central side, this being the opposite side to the side installed with the inflator 22A, enables the ease of mounting and the support strength of the inflator 104 with respect to the seatback 94 to be secured. "Securing the ease of mounting to the seatback" encompasses avoiding crowded placement of the inflator 22A of the side airbag device 22 and the inflator 104 (this also encompasses reducing constraints on placement structures and ease of operation). "Securing support strength with a simple structure" encompasses securing support strength at the same time as avoiding provision of an additional frame corresponding to a top frame.

In addition, although omitted from the explanation, the occupant protection device 90 according to the third exemplary embodiment is capable of obtaining basically the same advantageous effects through basically the same operation as that of the occupant protection device 10 according to the first exemplary embodiment, with the exception of operation and advantageous effects obtained as a result of providing the module case 34.

Modified Example of the Third Exemplary Embodiment

Note that in the third exemplary embodiment described above, an example has been given of application to the vehicle seat 92 including the seatback 94 with an integral headrest, in which the headrest section 94H is connected so as to be continuous to the upper portion of the backrest section 94B. However, the present disclosure is not limited thereto. For example, configuration may be made in which the inflator 32 is supported on the seatback frame on the vehicle width direction central side out of a pair of side frames (not illustrated in the drawings) configuring the seatback 16 of the vehicle seat 12 according to the first exemplary embodiment. Namely, in the multidirectional airbag device 20, configuration may be made in which the inflator 32 is supported on the seatback frame on the vehicle width direction central side, and the inflator 32 and the multidirectional airbag 30 are connected together in a state in communication with each other through the cloth tube 106. In such a configuration, for example, the ease of mounting and support strength of the inflator 32 with respect to the seatback 16 can be secured by a configuration in which the cloth tube 106 is provided with excess length in order to enable the height of the headrest 18 to be adjusted.

Moreover, although not specifically described in the third exemplary embodiment above, the seatback 94 may, for example, include a back board that is configured from a resin material and that covers the backrest section 94B and the headrest section 94H from the rearward direction. Such a configuration enables at least part of the functionality of the module case 34 to be attained by the back board, with the headrest section 94H corresponding to the headrest body 19.

Moreover, in the third exemplary embodiment described above, an example has been given in which the multidirectional airbag device 100 is configured including the multidirectional airbag 30 according to the first exemplary embodiment; however, the present disclosure is not limited thereto. For example, the multidirectional airbag device 100 may be configured including the multidirectional airbag 74 according to the second exemplary embodiment.

Modified Examples of the Respective Exemplary Embodiments

Note that in the first and second exemplary embodiments, examples have been given in which the occupant protection device 10, 70 is provided with the side airbag device 22; however, the present disclosure is not limited thereto. For example, the occupant protection device 10, 70 may be configured without providing the side airbag device 22. Moreover, configurations in which the occupant protection device 10, 70 is provided with a side airbag device are not limited to configurations in which the side airbag device is provided to the vehicle seat 12. For example, the occupant protection device 10, 70 may include a side airbag device provided in a vehicle side-door or the like. Moreover, in the respective exemplary embodiments described above, examples have been given in which the occupant protection device 10, 70 is provided with the side airbag device 22 at the vehicle width direction outer side; however, the present disclosure is not limited thereto. For example, the occupant protection device 10, 70 may be configured including a side airbag device disposed on the vehicle width direction central side instead of, or in addition to, the side airbag device 22 on the vehicle width direction outer side.

Figure 12:
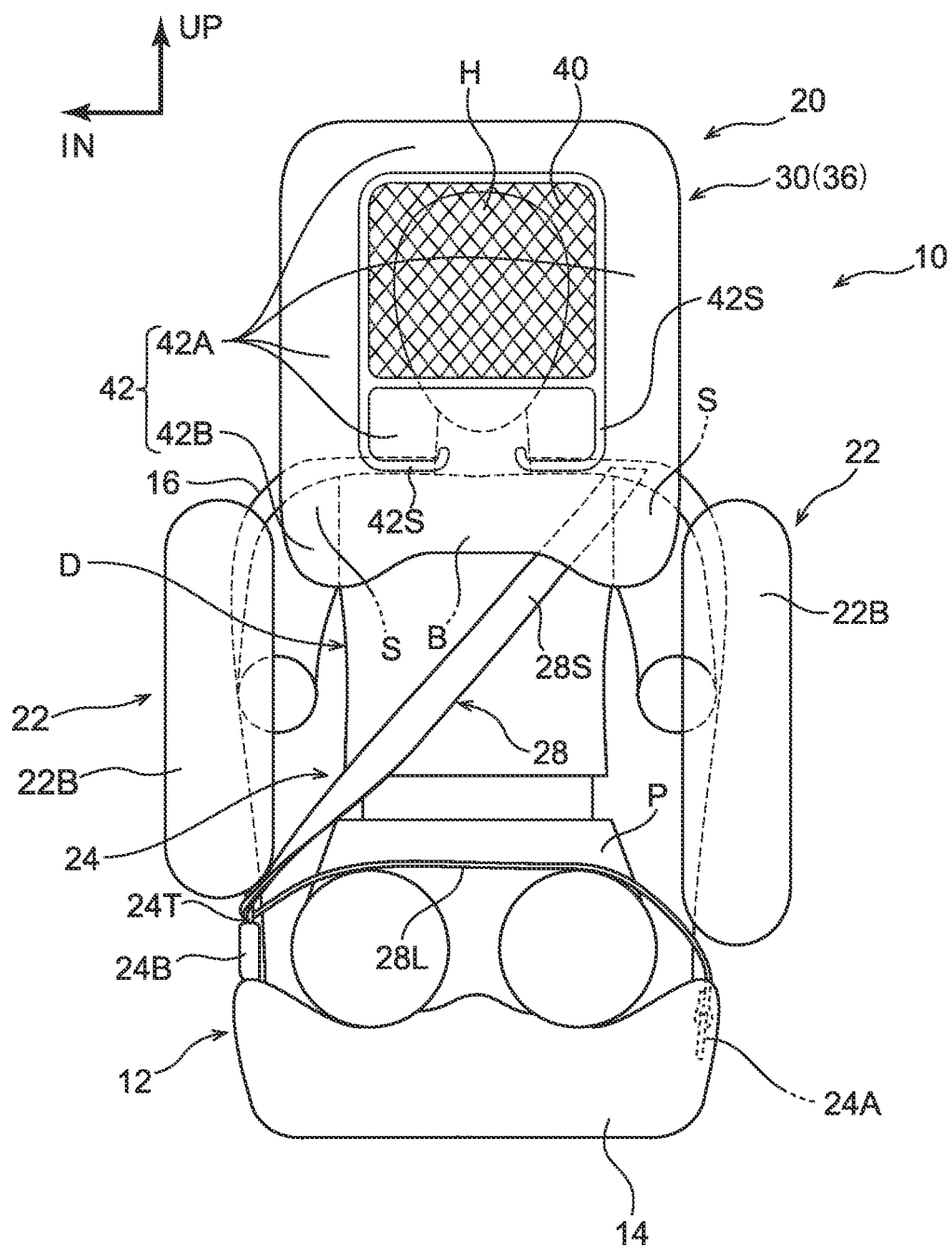
FIG. 12 is a front view schematically illustrating a modified example of an occupant protection device according to the first exemplary embodiment.

Namely, the occupant protection device 10, 70 may be configured including side airbag devices 22 (side airbags 22B) at side sections on both seat width direction sides of the seatback 16. FIG. 12 illustrates a configuration in which the occupant protection device 10 includes side airbag devices 22 at side sections on both seat width direction sides of the seatback 16. In this configuration, the vehicle seats 12 are, for example, configured as a pair of rotatable facing vehicle seats, such that the seated occupant D can be protected from side-on collisions on either the left or the right even when the seat is disposed facing toward the vehicle rear (reversed in the front-rear direction).

In each of the exemplary embodiments described above, examples have been given in which the occupant protection device 10, 70, 90 includes the seatbelt device 24; however, the present disclosure is not limited thereto. For example, a configuration may be applied in which the occupant protection device 10, 70, 90 does not include the seatbelt device 24. Moreover, in configurations in which the occupant protection device 10, 70, 90 does include a seatbelt device, there is no limitation to a configuration in which the seatbelt device is provided to the vehicle seat 12, 92. For example, configuration may be made in which the retractor, the anchor, the buckle, and the like are provided on the vehicle body side. Moreover, in configurations in which the occupant protection device 10, 70, 90 does include the seatbelt device, there is no limitation to a three-point type seatbelt device, and a four-point type or a two-point type seatbelt device may be employed.

In each of the above exemplary embodiments, examples have been given in which the seat width direction of the vehicle seat 12, 92 corresponds to the vehicle width direction. However, the present disclosure is not limited thereto. For example, the vehicle seat 12, 92 may be disposed at an angle with respect to the vehicle body, or a configuration may be applied in which the orientation of the vehicle seat 12, 92 with respect to the vehicle body can be changed (rotated about a vertical axis). In such a configuration, configurations including the multidirectional airbag 30, 74 that is inflated and deployed so as to surround the head H of the seated occupant D can contribute to good protection of the head H. Moreover, since the multidirectional airbag 30, 74 is housed in the headrest 18 or the seatback 94 prior to being inflated and deployed, the multidirectional airbag 30, 74 is not liable to impinge on surfaces inside the vehicle cabin or vehicle interior configuration components, and is suppressed or prevented from hindering operations to change the orientation of the vehicle seat 12, 92 with respect to the vehicle body.

Moreover, in the exemplary embodiments described above, examples have been given in which at least the multidirectional airbag 30, 74 of the multidirectional airbag device 20, 72, 100 is housed inside the headrest 18 or the seatback 94; however, the present disclosure is not limited thereto. For example, at least a portion of the multidirectional airbag 30, 74 configuring the multidirectional airbag device 20, 72, 92 may be disposed inside the seatback 16 or the seatback 94 (backrest section 94B). For example, in a configuration in which the seatback 16 includes a back board, configuration may be made in which at least a portion of the multidirectional airbag 30, 74 is housed between the back board and a seatback body. Moreover, in configurations in which the multidirectional airbag 30, 74 is provided inside a headrest, a configuration in which the functionality of a headrest is attained suffices, and, for example, at least a portion of the multidirectional airbag 30, 74 may be provided between a headrest cushion member and a covering member. Moreover, at least a portion of the multidirectional airbag 30, 74 may be provided straddling the seatback 16 and the headrest 18, or straddling the backrest section 94B and the headrest section 94H.

In the above exemplary embodiments, examples have been given in which the multidirectional airbag 30, 74 is inflated and deployed so as to pass between respective upper portions and both left and right side portions of the module case 34 and the headrest body 19 as viewed from the front, or through a splitting portion of the burst line BL; however, the present disclosure is not limited thereto. For example, a configuration may be applied in which the multidirectional airbag 30, 74 is only deployed above the headrest 18 or the headrest section 94H.

In the exemplary embodiments described above, an example has been given in which the multidirectional airbag 30, 74 is configured including the upper deployment section 48 and the rear deployment section 52; however, the present disclosure is not limited thereto. It is sufficient that the multidirectional airbag be configured including at least a front deployment section and left and right lateral deployment sections. Accordingly, for example, configuration may be made in which gas from an inflator is supplied to a front inflating portion of the front deployment section through a lateral inflating portion of one or both lateral deployment sections. Accordingly, the multidirectional airbag 30, 74 is not limited to a configuration including an upper deployment section in which the upper deployment section includes the upper inflating portion 50 (upper duct portions 50D). Moreover, in a configuration in which a multidirectional airbag includes duct portions, there is no limitation to a configuration including a pair of left and right of ducts. For example, a duct portion may be formed at only the seat width direction center, or a duct portion may be formed across the entire width of the upper deployment section.

In the exemplary embodiments described above, examples have been given in which the front deployment section 36 and the lateral deployment sections 38 configuring the multidirectional airbag 30, 74 respectively include the front inflating portion 42 and the lateral inflating portions 44. However, the present disclosure is not limited thereto. For example, configuration may be made in which any out of a front deployment section and left or right lateral deployment sections are not provided with inflating portions. Accordingly, a multidirectional airbag is not limited to configurations in which a front inflating portion is inflated and deployed earlier than lateral inflating portions. Moreover, the second inflating portion 42B, 80C of the front inflating portion 42, 80 is not limited to configurations that restrain both the shoulders S and the chest B of the seated occupant D, and the second inflating portion 42B, 80C of the front inflating portion 42, 80 may be configured so as to restrain either the shoulders S or the chest B.

In the exemplary embodiments described above, an example has been given in which the multidirectional airbag 30, 74 includes the seam portions 46, 47 serving as non-inflating portions; however, the present disclosure is not limited thereto. For example, an integral bag body may be configured in which a front deployment section and left and right lateral deployment sections do not include non-inflating portions. For example, a multidirectional airbag may also be configured without clear boundaries between a front deployment section (front inflating portion) and lateral deployment sections (lateral inflating portions). From this perspective, too, it may be said that the multidirectional airbag is not limited to a configuration in which a front inflating portion is inflated and deployed earlier than lateral inflating portions.

Moreover, in the exemplary embodiments described above, examples have been given in which the front deployment section 36 configuring the multidirectional airbag 30, 74 includes the first inflating portion 42A, 80A that restrains the head H, and the first and second shoulder restraint portions 80B, 80C that restrain the chest B and the shoulders S; however, the present disclosure is not limited thereto. For example, configuration may be made in which the second inflating portions of the front deployment section configuring the multidirectional airbag 30, 74 only restrain either the chest or the shoulders. Moreover, the front deployment section of the multidirectional airbag 30, 74 may be configured including a second inflating portion such that, out of the shoulders S of the seated occupant D, the second inflating portion only restrains the shoulder S on the side that is not restrained by the shoulder belt 28S.

Moreover, in the exemplary embodiments described above, an example has been given in which the front deployment section configuring the multidirectional airbag 30, 74 includes the mesh portion 40; however, the present disclosure is not limited thereto. For example, configuration may be made in which a transparent sheet is provided as a see-through structure in place of the mesh portion 40, or configuration may be made without a see-through structure.

In the exemplary embodiments described above, an example has been given in which the multidirectional airbag 30, 74 is rolled up outward; however, the present disclosure is not limited thereto. For example, the multidirectional airbag 30, 74 may be housed in the headrest 18, the seatback 16, 94, or the like by employing another folding style, such as concertina folding.

In each of the above exemplary embodiments, examples have been given in which the multidirectional airbag device 20, 72, 100 includes the deployment guide cloth 58; however, the present disclosure is not limited thereto. For example, a configuration may be applied in which the deployment guide cloth 58 is not included. Alternatively, for example, the ceiling material of the vehicle cabin ceiling may be configured by a low friction material, or low friction treatment may be applied to the vehicle cabin ceiling, instead of making configuration in which the deployment guide cloth 58 is provided.

Moreover, an example has been given in which the occupant protection device 70 (multidirectional airbag device 72) according to the second exemplary embodiment includes the coupling strap 76; however, the present disclosure is not limited thereto. For example, in the occupant protection device 10, 90 (multidirectional airbag device 20, 100) according to the first and third exemplary embodiments, configuration may be made including a coupling strap, serving as a coupling cloth, that is deployed so as to couple the second inflating portion 42B, serving as an upper body restraint portion, together with the headrest 18 (rear deployment section 52).

Obviously, various modifications may be implemented to the present disclosure within a range not departing from the spirit thereof. For example configurations (elements) of each of the above exemplary embodiments and modified examples may be combined or swapped as appropriate.

Supplement

An occupant protection device of a first aspect includes an airbag that inflates and deploys from a state of being housed in a headrest or seatback on receipt of supplied gas; the airbag being configured as an integral bag body to surround the head of an occupant with a front deployment section and a pair of left and right lateral deployment sections. The front deployment section includes a front inflating portion that inflates and deploys to a seat forward direction of the head of the occupant and of at least one of a shoulder or chest of the occupant. Each of the pair of left and right lateral deployment sections includes a lateral inflating portion that is connected to the front deployment section and that inflates and deploys alongside the head of the occupant.

An occupant protection device of a second aspect is the configuration of the first aspect, wherein: the front inflating portion is partitioned from each of the lateral inflating portions by a vertically-extending non-inflating portion; and the front inflating portion is configured so as to inflate and deploy earlier than the lateral inflating portions.

An occupant protection device of a third aspect is the configuration of the second aspect, wherein the lateral inflating portions inflate and deploy on receipt of supplied gas from the front inflating portion.

An occupant protection device of a fourth aspect is the configuration of any one of the first aspect to the third aspect, wherein the lateral inflating portions are configured such that, in an inflated and deployed state of the lateral inflating portions having received supplied gas, lower ends of the lateral inflating portions contact shoulders of the occupant from above.

An occupant protection device of a fifth aspect is the configuration of any one of the first aspect to the fourth aspect, further including a three-point type seatbelt device to restrain a waist of the occupant with a lap belt and to restrain an upper body of the occupant with a shoulder belt. The front inflating portion is configured including a first shoulder restraint portion that, upon receipt of supplied gas, inflates and deploys to the seat forward direction of the shoulder on the shoulder belt-restrained side of the occupant, and a second shoulder restraint portion that upon receipt of supplied gas, inflates and deploys closer to the occupant than the first shoulder restraint portion to the seat forward direction of a shoulder on a non-shoulder belt-restrained side of the occupant.

An occupant protection device of a sixth aspect is the configuration of the fifth aspect, wherein a capacity of the second shoulder restraint portion is greater than a capacity of the first shoulder restraint portion.

An occupant protection device of a seventh aspect is the configuration of any one of the first aspect to the sixth aspect, wherein the front inflating portion is configured including an upper body restraint portion that inflates and deploys to the seat forward direction of at least one of the shoulder or chest of the occupant. The occupant protection device further includes a coupling cloth that deploys in a state of coupling the upper body restraint portion to either the headrest or seatback, and that has a stretch ratio equivalent to or less than that of the airbag.

An occupant protection device of an eighth aspect is the configuration of any one of the first aspect to the seventh aspect, wherein the airbag further includes a duct portion that inflates and deploys from the headrest or seatback toward the seat forward direction and above the head of an occupant, and that supplies gas to the front inflating portion.

An occupant protection device of a ninth aspect is the configuration of the eighth aspect, wherein the airbag is housed inside the headrest or seatback in a state in which a portion of the airbag including the front inflating portion and the duct portion is folded up in an outwardly rolled shape from a front end side toward a seat upper side and rear side.

An occupant protection device of a tenth aspect is the configuration of any one of the first aspect to the ninth aspect, further including a guide cloth that is configured with a lower coefficient of friction with respect to the airbag than a vehicle ceiling material, and that deploys from an upper portion of the headrest or seatback earlier than the airbag inflates and deploys.

An occupant protection device of an eleventh aspect is the configuration of any one of the first aspect to the tenth aspect, further including a module case that is disposed to a seat rearward direction of a headrest body configuring the headrest, and that houses the airbag in a folded-up state and houses an inflator for supplying gas to the airbag.

An occupant protection device of a twelfth aspect is the configuration of the eleventh aspect, wherein the module case is configured to jut out upward of and to both seat width direction sides of the headrest.

An occupant protection device of a thirteenth aspect is the configuration of either the eleventh aspect or the twelfth aspect, wherein the module case includes a rear wall having an upper end projecting out further upward than the headrest and tilting forward, the rear wall being configured to function as a support wall to support the airbag from the seat rearward direction during an inflation and deployment process.

An occupant protection device of a fourteenth aspect is the configuration of any one of the eleventh aspect to the thirteenth aspect, wherein the module case includes a rear wall having an upper end projecting out further upward than the headrest and tilting forward, the rear wall being configured to function as a guide wall to guide the airbag toward the seat forward direction during an inflation and deployment process.

An occupant protection device of a fifteenth aspect is the configuration of any one of the eleventh aspect to the fourteenth aspect, wherein: a stay of the headrest is formed in a crank shape such that an upper portion of the stay is positioned further toward the seat forward direction than a lower portion of the stay; and the airbag is housed to the rearward direction of the upper portion of the stay.

An occupant protection device of a sixteenth aspect is the configuration of any one of the first aspect to the fifteenth aspect, further including a side airbag that inflates and deploys alongside an upper body of the occupant upon receipt of supplied gas. Configuration is made such that the airbag does not overlap with the side airbag in a non-restraining inflated and deployed state of the side airbag in side view in a non-restraining inflated and deployed state of the airbag.

An occupant protection device of a seventeenth aspect is the configuration of the sixteenth aspect, wherein the side airbag is respectively provided at side sections on both seat width direction sides of the seatback.

An occupant protection device of an eighteenth aspect is the configuration of the sixteenth aspect, wherein the side airbag is provided at an outer side section at a vehicle width direction outer side of the seatback. The occupant protection device further includes: a first inflator that is supported by a frame at an inner side of the outer side section, and that supplies gas to the side airbag; and a second inflator that is supported by a frame at an inner side of an inner side section at a vehicle width direction central side of the seatback, and that supplies gas to the airbag.

An occupant protection device of a nineteenth aspect is the configuration of the eighteenth aspect, wherein the airbag is housed in a seatback including an integral headrest.

An occupant protection device of a twentieth aspect is the configuration of any one of the first aspect to the nineteenth aspect, wherein the front deployment section is configured including a see-through structure provided at a portion positioned in front of the head of the occupant and allowing the occupant to see an area at the front side of the front deployment section.

An occupant protection device of another aspect includes an airbag that inflates and deploys from a state of being housed in a headrest or seatback on receipt of supplied gas; the airbag being configured as an integral bag body to surround the head of an occupant with a front deployment section and a pair of left and right lateral deployment sections. The front deployment section deploys to a seat forward direction of the head of the occupant and of at least one of a shoulder or chest of the occupant. Each of the pair of left and right lateral deployment sections is connected to the front deployment section and inflates and deploys alongside the head of the occupant.

The disclosure of Japanese Patent Application No. 2015-091472, filed on Apr. 28, 2015, is incorporated in its entirety by reference herein.

The reference numerals employed herein and the names of the respective members correspond as follows.

EXPLANATION OF THE REFERENCE NUMERALS 10 occupant protection device
12 vehicle seat
16 seatback
18 headrest
18S headrest stay (stay)
19 headrest body
22A inflator (first inflator)
22B side airbag
24 seatbelt device
28S shoulder belt
28L lap belt
30 multidirectional airbag (airbag)
32 inflator
34 module case
34M main wall (rear wall)
36 front deployment section
38 lateral deployment section
40 mesh portion (see-through structure)
42 front inflating portion
42B second inflating portion (upper body restraint portion)
44 lateral inflating portion
44L lower end of lateral inflating portion
47 seam portion (non-inflating portion)
50D upper duct portion (duct portion)
58 deployment guide cloth (guide cloth)
70, 90 occupant protection device
74 multidirectional airbag (airbag)
76 coupling strap (coupling cloth)
78 front deployment section
80 front inflating portion
80B inflating portion (first shoulder restraint portion, upper body restraint portion)
80C inflating portion (second shoulder restraint portion, upper body restraint portion)
92 vehicle seat
94 seatback (seatback including an integral headrest)
94B backrest section
94H headrest section
96S side frame (frame)
104 inflator (second inflator)
D seated occupant (occupant)

The invention claimed is:

1. An occupant protection device comprising:
   an airbag that inflates and deploys from a state of being housed in a headrest or seatback on receipt of supplied gas, the airbag being configured as an integral bag body to surround a head of an occupant with a front deployment section and a pair of left and right lateral deployment sections; and
   the front deployment section comprising a front inflating portion that inflates and deploys to a seat forward direction of the head of the occupant and of at least one of a shoulder or chest of the occupant, and the pair of left and right lateral deployment sections each comprising a lateral inflating portion that is connected to the front deployment section and that inflates and deploys alongside the head of the occupant,
   wherein:
   the front inflating portion is partitioned from each of the lateral inflating portions by a vertically-extending non-inflating portion, and the front inflating portion is configured so as to inflate and deploy earlier than the lateral inflating portions.

2. The occupant protection device of claim 1, wherein the lateral inflating portions inflate and deploy on receipt of supplied gas from the front inflating portion.

3. The occupant protection device of claim 1, wherein the lateral inflating portions are configured such that, in an inflated and deployed state of the lateral inflating portions having received supplied gas, lower ends of the lateral inflating portions contact shoulders of the occupant from above.

4. The occupant protection device of claim 1, further comprising a three-point type seatbelt device to restrain a waist of the occupant with a lap belt and to restrain an upper body of the occupant with a shoulder belt, wherein:
the front inflating portion is configured to comprise:
a first shoulder restraint portion that, upon receipt of supplied gas, inflates and deploys to the seat forward direction of a shoulder on a shoulder belt-restrained side of the occupant, and
a second shoulder restraint portion that, upon receipt of supplied gas, inflates and deploys closer to the occupant than the first shoulder restraint portion to the seat forward direction of a shoulder on a non-shoulder belt-restrained side of the occupant.

5. The occupant protection device of claim 4, wherein a capacity of the second shoulder restraint portion is greater than a capacity of the first shoulder restraint portion.

6. The occupant protection device of claim 1, wherein:
the front inflating portion is configured to comprise an upper body restraint portion that inflates and deploys to the seat forward direction of at least one of the shoulder or chest of the occupant; and
the occupant protection device further comprises a coupling cloth that deploys in a state of coupling the upper body restraint portion to either the headrest or seatback, and that has a stretch ratio equivalent to or less than that of the airbag.

7. The occupant protection device of claim 1, wherein the airbag further comprises a duct portion that inflates and deploys from the headrest or seatback toward the seat forward direction and above the head of the occupant, and that supplies gas to the front inflating portion.

8. The occupant protection device of claim 7, wherein the airbag is housed inside the headrest or seatback in a state in which a portion of the airbag comprising the front inflating portion and the duct portion is folded up in an outwardly rolled shape from a front end side toward a seat upper side and rear side.

9. The occupant protection device of claim 1, further comprising a guide cloth that is configured with a lower coefficient of friction with respect to the airbag than a vehicle ceiling material, and that deploys from an upper portion of the headrest or seatback earlier than the airbag inflates and deploys.

10. The occupant protection device of claim 1, further comprising a module case that is disposed to a seat rearward direction of a headrest body configuring the headrest, and that houses the airbag in a folded-up state and houses an inflator for supplying gas to the airbag.

11. The occupant protection device of claim 10, wherein the module case is configured to jut out upward of and to both seat width direction sides of the headrest.

12. The occupant protection device of claim 10, wherein the module case comprises a rear wall having an upper end projecting out further upward than the headrest and tilting forward, the rear wall being configured to function as a support wall to support the airbag from the seat rearward direction during an inflation and deployment process.

13. The occupant protection device of claim 10, wherein the module case comprises a rear wall having an upper end projecting out further upward than the headrest and tilting forward, the rear wall being configured to function as a guide wall to guide the airbag toward the seat forward direction during an inflation and deployment process.

14. The occupant protection device of claim 10, wherein:
a stay of the headrest is formed in a crank shape such that an upper portion of the stay is positioned further toward the seat forward direction than a lower portion of the stay; and
the airbag is housed to the rearward direction of the upper portion of the stay.

15. The occupant protection device of claim 1, further comprising a side airbag that inflates and deploys alongside an upper body of the occupant upon receipt of supplied gas, wherein:
configuration is made such that the airbag does not overlap with the side airbag in side view in a non-restraining inflated and deployed state of the airbag and a non-restraining inflated and deployed state of the side airbag.

16. The occupant protection device of claim 15, wherein the side airbag is respectively provided at side sections on both seat width direction sides of the seatback.

17. The occupant protection device of claim 15, wherein:
the side airbag is provided at an outer side section at a vehicle width direction outer side of the seatback; and
the occupant protection device further comprises:
a first inflator that is supported by a frame at an inner side of the outer side section, and that supplies gas to the side airbag, and
a second inflator that is supported by a frame at an inner side of an inner side section at a vehicle width direction central side of the seatback, and that supplies gas to the airbag.

18. The occupant protection device of claim 17, wherein the airbag is housed in a seatback comprising an integral headrest.

19. The occupant protection device of claim 1, wherein the front deployment section is configured to comprise a see-through structure provided at a portion positioned in front of the head of the occupant and allowing the occupant to see an area at the front side of the front deployment section.

20. The occupant protection device of claim 1, wherein the lateral inflating portion is partitioned to the front and rear at a portion of the vertically-extending non-inflating portion.

* * * * *